(12) United States Patent
Suzuki et al.

(10) Patent No.: US 12,011,813 B2
(45) Date of Patent: Jun. 18, 2024

(54) ELECTRIC WORK MACHINE

(71) Applicant: MAKITA CORPORATION, Anjo (JP)

(72) Inventors: Hitoshi Suzuki, Anjo (JP); Seitaro Hayashi, Anjo (JP); Motohiro Omura, Anjo (JP); Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 793 days.

(21) Appl. No.: 17/014,012

(22) Filed: Sep. 8, 2020

(65) Prior Publication Data

US 2021/0069886 A1 Mar. 11, 2021

(30) Foreign Application Priority Data

Sep. 9, 2019 (JP) ................................. 2019-163761

(51) Int. Cl.
*H02H 7/097* (2006.01)
*B25F 5/00* (2006.01)
(Continued)

(52) U.S. Cl.
CPC ............. *B25F 5/001* (2013.01); *H02H 7/097* (2013.01); *H02P 29/028* (2013.01); *H02P 6/12* (2013.01);
(Continued)

(58) Field of Classification Search
CPC ............... B25F 5/02; B25F 5/001; F16H 3/64
See application file for complete search history.

(56) References Cited

U.S. PATENT DOCUMENTS

2013/0292147 A1* 11/2013 Mergener ................ B25B 21/00
173/20
2014/0262404 A1* 9/2014 Sawano .................. B25B 21/00
173/178
(Continued)

FOREIGN PATENT DOCUMENTS

| JP | 2008183691 A | 8/2008 |
| JP | 2015013327 A | 1/2015 |
| JP | 2018083254 A | 5/2018 |

OTHER PUBLICATIONS

Circuit Digest—https://circuitdigest.com/electronic-circuits/2-way-switch-working-connection-diagram-and-demonstration, Published Nov. 23, 2017 (Year: 2017).*
(Continued)

*Primary Examiner* — Daniel Jeremy Leeds
(74) *Attorney, Agent, or Firm* — J-TEK LAW PLLC; Jeffrey D. Tekanic; Scott T. Wakeman

(57) ABSTRACT

An electric work machine (1; 110; 120; 130), such as a power tool, includes a motor (11) having a rotor, a drive part (13) that supplies electric currents to drive the motor, a rotational-direction selection part (17), and a motor-control part (14; 31, 32, 40, 50, 60; 14, 40, 60, 73, 80; 14, 60, 91). The rotational-direction selection part is configured for manually setting (selecting) the rotational direction of the rotor and outputs first and second setting signals that each indicate the set (selected) rotational direction. The motor-control part controls the drive part such that the rotor rotates in the rotational direction indicated by the first setting signal and/or the second setting signal. In response to a determination that the rotational directions indicated by the first and second setting signals are inconsistent, the motor-control part stops or prevents the drive of the motor.

23 Claims, 14 Drawing Sheets

(51) Int. Cl.
  *H02P 6/12*    (2006.01)
  *H02P 6/16*    (2016.01)
  *H02P 6/22*    (2006.01)
  *H02P 6/24*    (2006.01)
  *H02P 29/028*  (2016.01)

(52) U.S. Cl.
  CPC .................. *H02P 6/16* (2013.01); *H02P 6/22* (2013.01); *H02P 6/24* (2013.01)

(56) References Cited

U.S. PATENT DOCUMENTS

2020/0067435 A1  2/2020  Nishimiya et al.
2020/0343838 A1  10/2020 Thrush et al.

OTHER PUBLICATIONS

Office Action from the Japanese Patent Office dispatched May 16, 2023 in related Japanese application No. 2019-163761, and machine translation thereof.

* cited by examiner

ELECTRIC WORK MACHINE

CROSS-REFERENCE

This application claims priority to Japanese patent application serial number 2019-163761, filed on Sep. 9, 2019, the contents of which are incorporated herein by reference in their entirety.

TECHNICAL FIELD

The present disclosure generally relates to techniques for controlling a motor in an electric work machine.

BACKGROUND ART

Some electric work machines (e.g., power tools), such as driver-drills, impact wrenches, etc. are equipped with a switch (e.g. a reversing switch lever), which is manipulated by a user to set the rotational direction of a motor. A control part of the electric work machine then rotates a rotor of the motor in the rotational direction that a setting signal, which is input from the switch, indicates.

SUMMARY OF THE INVENTION

In such electric work machines, if a problem arises in the switch or in the wiring connected to the switch, then there is a possibility that the rotor of the motor will rotate in a direction not intended by the user. For example, if the switch is faulty and the setting signal is no longer properly input to the control part, then there is a possibility that, even though the user has manipulated the switch to rotate the motor, for example, in a first direction, the motor will rotate in a second (opposite) direction.

An object of the present disclosure is to inhibit or prevent rotation of a rotor of a motor in a direction that differs from the rotational direction, which the user has set by manipulating a switch or the like (i.e., in a rotational direction that the user did not intend).

An electric work machine according to one aspect of the present disclosure comprises a motor, a drive part, a rotational-direction selection part, and a motor-control part. The drive part drives the motor using electric power (current) supplied from a power supply. The rotational-direction selection part is configured to be manipulated to selectively set (select) the rotational direction of the motor (more specifically, a rotor of the motor) to either a first rotational direction (e.g., clockwise) or a second rotational direction (e.g., counterclockwise) and to output both a first setting signal and a second setting signal. The first setting signal and the second setting signal each indicate (correspond to) the set rotational direction.

The motor-control part controls the drive part such that the motor (rotor) rotates in the rotational direction indicated by (corresponding to) the first setting signal and/or the second setting signal, which have been output from the rotational-direction selection part. The motor-control part stops or prevents rotation of the motor (rotor) in response to a determination that the rotational direction indicated by the first setting signal and the rotational direction indicated by the second setting signal are inconsistent.

With regard to an electric work machine configured in this manner, for example, when an abnormality (hereinbelow, called "setting-signal inconsistency"), in which the rotational direction indicated by first setting signal and the rotational direction indicated by second setting signal are inconsistent, occurs owing to a fault (failure, defect) in the rotational-direction selection part or owing to some other type of cause, the rotation of the motor (rotor) is stopped. Consequently, when a setting-signal inconsistency arises, it becomes possible to inhibit (prevent, stop) rotation of the motor (rotor) in a direction that differs from the rotational direction that the user of the electric work machine set by manipulating the rotational-direction selection part (i.e., in the rotational direction that the user did not intend).

It is noted that the determination of whether a setting-signal inconsistency has occurred may be made by, for example, acquiring the first setting signal and the second setting signal and comparing the rotational directions indicated by both, but also may be made based on information corresponding to the first setting signal and/or information corresponding to the second setting signal. That is, for example, information that changes in accordance with the first setting signal may be acquired, and the rotational direction that indicates the first setting signal may be acquired from that information. Furthermore, the determination of whether a setting-signal inconsistency has occurred may be made based on the rotational direction acquired in this manner and the rotational direction indicated by the second setting signal.

The motor-control part may comprise a control circuit, e.g., a controller or processor. The control circuit preferably inputs or receives the first setting signal and the second setting signal, which were output from the rotational-direction selection part, and controls the drive part such that the motor (rotor) rotates in the rotational direction indicated by that inputted first setting signal and/or that inputted second setting signal. The control circuit controls the drive part such that the rotation of the motor (rotor) is stopped or prevented in response to a determination that the rotational direction indicated by the first setting signal and the rotational direction indicated by the second setting signal are inconsistent.

With regard to an electric work machine configured in this manner, when a setting-signal inconsistency has occurred, the rotation of the motor (rotor) is stopped because the control circuit controls (e.g., stops the supply of drive signals to) the drive part. Consequently, stoppage of the rotation of the motor (rotor) when a setting-signal inconsistency has occurred can be achieved with a simple configuration.

In another embodiment of the above-described aspect, the motor-control part may comprise a control circuit (e.g., a controller or process), to which the first setting signal output from the rotational-direction selection part is input, a determination circuit, and a stop circuit. In this embodiment, the control circuit preferably controls the drive part such that the motor (rotor) rotates in the rotational direction indicated by the inputted first setting signal. The determination circuit inputs (receives) the second setting signal output from the rotation-direction selection part and determines whether the rotational direction indicated by that inputted second setting signal and the actual rotational direction of the motor are consistent. The stop circuit stops (prevents) the rotation of the motor (rotor) in response to a determination by the determination circuit that there is an inconsistency between the inputted second setting signal and the actual rotational direction of the motor.

The actual rotational direction is one piece of information that is dependent on, and corresponds to, the first setting signal. That is, it can be understood that the actual rotational direction is the rotational direction indicated by the first setting signal. Consequently, it can be understood that (a) the determination of whether the rotational direction indicated by the second setting signal and the actual rotational direction are consistent and (b) the determination of whether a setting-signal inconsistency has occurred are, in essence, equivalent.

With regard to an electric work machine configured in this manner, the determination of whether a setting-signal inconsistency has occurred and whether stoppage of the rotation of the motor (rotor) when a setting-signal inconsistency has occurred are achieved by the determination circuit and the stop circuit, which are provided separately (discretely) from the control circuit. Consequently, even if an abnormality were to occur in the control circuit, rotation of the motor (rotor) could still be appropriately stopped in case a setting-signal inconsistency has occurred.

In an embodiment of an electric work machine configured to determine, using the determination circuit, whether a setting-signal inconsistency has occurred, the control circuit, in addition to the determination circuit, may determine whether a setting-signal inconsistency has occurred. Furthermore, when a setting-signal inconsistency has occurred, the control circuit may control the drive part such that the rotation of the motor (rotor) is stopped.

With regard to an electric work machine configured in this manner, when a setting-signal inconsistency has occurred, because the control of the drive part is performed by the control circuit and because the rotation of the motor (rotor) is stopped by the stop circuit, it becomes possible to stop the motor (rotor) in a more reliable manner.

The determination circuit may comprise a rotational-direction detection circuit and a determination-execution circuit. The rotational-direction detection circuit detects the actual rotational direction of the rotor. The determination-execution circuit determines whether the rotational direction indicated by the second setting signal, which has been input to (received by) the determination circuit, and the actual rotational direction detected by the rotational-direction detection circuit are consistent.

With regard to an electric work machine configured in this manner, it becomes possible to appropriately determine whether a setting-signal inconsistency has occurred.

The electric work machine may further comprise a position-information output part configured to output rotational-position information corresponding to the rotational position of the motor. The rotational-direction detection circuit may be configured to detect the actual rotational direction based on the rotational-position information output from the position-information output part.

With regard to an electric work machine configured in this manner, it becomes possible to appropriately detect the actual rotational direction and, in turn, to appropriately determine whether a setting-signal inconsistency has occurred based on that detected actual rotational direction.

The control circuit may be configured to control the drive part by outputting a drive instruction (or drive instructions) to the drive part. The rotational-direction detection circuit may be configured to input (receive) the drive instruction(s), which is (are) input from (supplied by) the control circuit to the drive part, and to detect the actual rotational direction based on the inputted drive instruction(s).

With regard to an electric work machine configured in this manner, it becomes possible to appropriately detect the actual rotational direction based on a drive instruction (or drive instructions) and, in turn, to appropriately determine whether a setting-signal inconsistency has occurred based on that detected actual rotational direction.

The motor-control part may further comprise a rotation-detection circuit and a disabling circuit. The rotation-detection circuit detects that (whether or not) the motor (rotor) is rotating. The disabling circuit disables a function that, while rotation of the motor (rotor) is not being detected, stops the rotation of the motor (rotor) using the stop circuit.

With regard to an electric work machine configured in this manner, when the motor (rotor) is stopped, the function of stopping the rotation of the motor (rotor) using the stop circuit is disabled, and consequently it becomes possible to achieve that function at an appropriate timing as needed.

The rotation-detection circuit may be configured to detect, based on the rotational-position information output from the position-information output part, that (whether or not) the motor (rotor) is rotating.

With regard to an electric work machine configured in this manner, it becomes possible to appropriately and easily determine, based on the rotational-position information, whether or not the motor (rotor) is rotating.

The rotation-detection circuit may be configured to input (receive) the drive instruction(s), which is (are) input from (supplied by) the control circuit to the drive part, and to detect, based on the inputted drive instruction(s), that (whether or not) the motor (rotor) is rotating.

With regard to an electric work machine configured in this manner, it becomes possible to appropriately and easily determine, based on the drive instruction(s), whether or not the motor (rotor) is rotating.

The drive part may comprise six switching devices, which include a first switching device and a second switching device. The drive instruction(s) may be composed of six drive signals, which are input to the six switching devices, respectively. The six drive signals each include a first drive signal input to the first switching device and a second drive signal input to the second switching device.

The control circuit generates three-phase electric power to drive the motor using the six drive signals by turning ON each of the six switching devices, during respective energization intervals, at each energization-start time that has been set for each of the six switching devices. The energization-start time of each of the six switching devices is a time that corresponds to the rotational position of the motor (i.e. the rotational position of the rotor relative to the stator), and the phases of the energization-start times are shifted from one another by a fixed electric angle. The energization interval is the interval from the energization-start time until the motor (rotor) rotates by an energization electric angle.

The rotational-direction detection circuit may be configured to detect the actual rotational direction based on the first drive signal and the second drive signal. It is noted that, herein, "based on the first drive signal and the second drive signal" does not mean based on only the first drive signal and the second drive signal. The rotational-direction detection circuit may detect the actual rotational direction based on another drive signal as well, i.e., in addition to the first drive signal and the second drive signal (that is, based on three or more drive signals).

With regard to an electric work machine configured in this manner, it becomes possible to appropriately and easily determine, based on two of the six drive signals, whether or not the motor is rotating.

The control circuit may be configured to generate the three-phase electric power using the six drive signals by controlling the ON time of each of the six switching devices using a pulse-width-modulation method while, during the respective energization intervals, periodically switching ON and OFF each of the six switching devices at a switching frequency. Furthermore, the electric work machine may further comprise a first low-pass filter and a second low-pass filter.

The first low-pass filter inputs (receives) the first drive signal and attenuates signal components, which are included (contained) in the first drive signal, having a frequency higher than a first cutoff frequency. Therefore, the first low-pass filter outputs a filtered first drive signal containing only signal components below the first cutoff frequency. The second low-pass filter inputs (receives) the second drive signal and attenuates signal components, which are included (contained) in the first drive signal, having a frequency higher than a second cutoff frequency. Therefore, the second low-pass filter outputs a filtered second drive signal containing only signal components below the second cutoff frequency. The first cutoff frequency and the second cutoff frequency are lower than the above-mentioned switching frequency.

Furthermore, the rotational-direction detection circuit may be configured to detect the actual rotational direction based on the first drive signal that has passed through the first low-pass filter (i.e. the filtered first drive signal) and the second drive signal that has passed through the second low-pass filter (i.e. the filtered first drive signal).

With regard to an electric work machine configured in this manner, because the first cutoff frequency and the second cutoff frequency are appropriately set by taking into consideration the switching frequency, it becomes possible to increase the detection accuracy of the actual rotational direction detected by the rotational-direction detection circuit.

The control circuit may be configured to rotate the motor (rotor) at a maximum rotational speed or lower. The first cutoff frequency and the second cutoff frequency may be higher than a maximum commutation frequency. The maximum commutation frequency is the inverse of the time needed for the motor (rotor) rotating at the maximum rotational speed to rotate (relative to the stator) by the above-mentioned fixed electrical angle.

With regard to an electric work machine configured in this manner, because the first cutoff frequency and the second cutoff frequency are more appropriately set by taking into consideration the maximum commutation frequency in addition to the switching frequency, it becomes possible to further increase the detection accuracy of the actual rotational direction detected by the rotational-direction detection circuit.

In another embodiment of the above-described aspect, the electric work machine may be configured as follows. That is, the drive part may comprise six switching devices. The drive instruction(s) may be composed of six drive signals that are input to the six switching devices, respectively. The control circuit may be configured to generate three-phase electric power for driving the motor using the six drive signals by turning ON each of the six switching devices during the corresponding energization interval. The energization intervals corresponding to the six switching devices are based on the rotational position of the motor (i.e. the rotational position of the rotor relative to the stator); the phases of the energization intervals differ from one another. The rotation-detection circuit may be configured to detect, based on one of the six drive signals, that (whether or not) the motor (rotor) is rotating.

It is noted that, herein, "based on one of the six drive signals" does not mean based on only one drive signal. The rotation-detection circuit may detect, based on two or more drive signals, whether or not the motor (rotor) is rotating.

With regard to an electric work machine configured in this manner, it becomes possible to appropriately and easily determine, based on one of the six drive signals, whether or not the motor (rotor) is rotating.

The electric work machine configured in this manner may be further configured as follows. That is, the control circuit may be configured to generate the three-phase electric power using the six drive signals by controlling the ON time of each of the six switching devices using a pulse-width-modulation method while periodically switching ON and OFF each of the six switching devices at a switching frequency during the respective energization intervals. The electric work machine may further comprise a low-pass filter configured to attenuate signal components, which are included (contained) in the one of the six drive signals, having a frequency higher than a cutoff frequency and to output a filtered drive signal. The cutoff frequency is lower than the switching frequency. Furthermore, the rotational-detection circuit may be configured to detect, based on the signal that has passed through the low-pass filter (i.e. the filtered drive signal), that (whether or not) the motor (rotor) is rotating.

With regard to an electric work machine configured in this manner, because the cutoff frequency is appropriately set by taking into consideration the switching frequency, it becomes possible to increase the detection accuracy of the actual rotational direction detected by the rotational-direction detection circuit.

In this embodiment, the cutoff frequency may be higher than the maximum commutation frequency. By making the cutoff frequency higher than the maximum commutation frequency, it becomes possible to further increase the detection accuracy of the actual rotational direction detected by the rotational-direction detection circuit.

The electric work machine according to any of the preceding aspects and embodiments may further comprise a trigger manipulatable part, which is configured to be manipulated by a user to cause the motor (rotor) to rotate. The motor-control part may be configured to control the drive part such that the motor (rotor) rotates in response to the trigger manipulatable part being manipulated (e.g., pressed or squeezed). The motor-control part may be configured to stop (prevent) the rotation of the motor (rotor) in response to a determination that the rotational direction indicated by the first setting signal and the rotational direction indicated by the second setting signal are inconsistent at or after the time at which the trigger manipulatable part was manipulated (e.g., at the point in time when the trigger manipulatable part was manipulated or after the trigger manipulatable part has been manipulated).

The rotational-direction selection part may be configured such that a neutral state, in which neither the first direction nor the second direction is selected, occurs. The motor-control part may be configured to stop (prevent) rotation of the motor (rotor) when the rotational-direction selection part is set to the neutral state.

DETAILED DESCRIPTION OF EMBODIMENTS OF THE INVENTION

Embodiments of the present disclosure are explained below, with reference to the drawings.

1. First Embodiment (1-1) Configuration of an Exemplary Electric Work Machine

Figure 1:
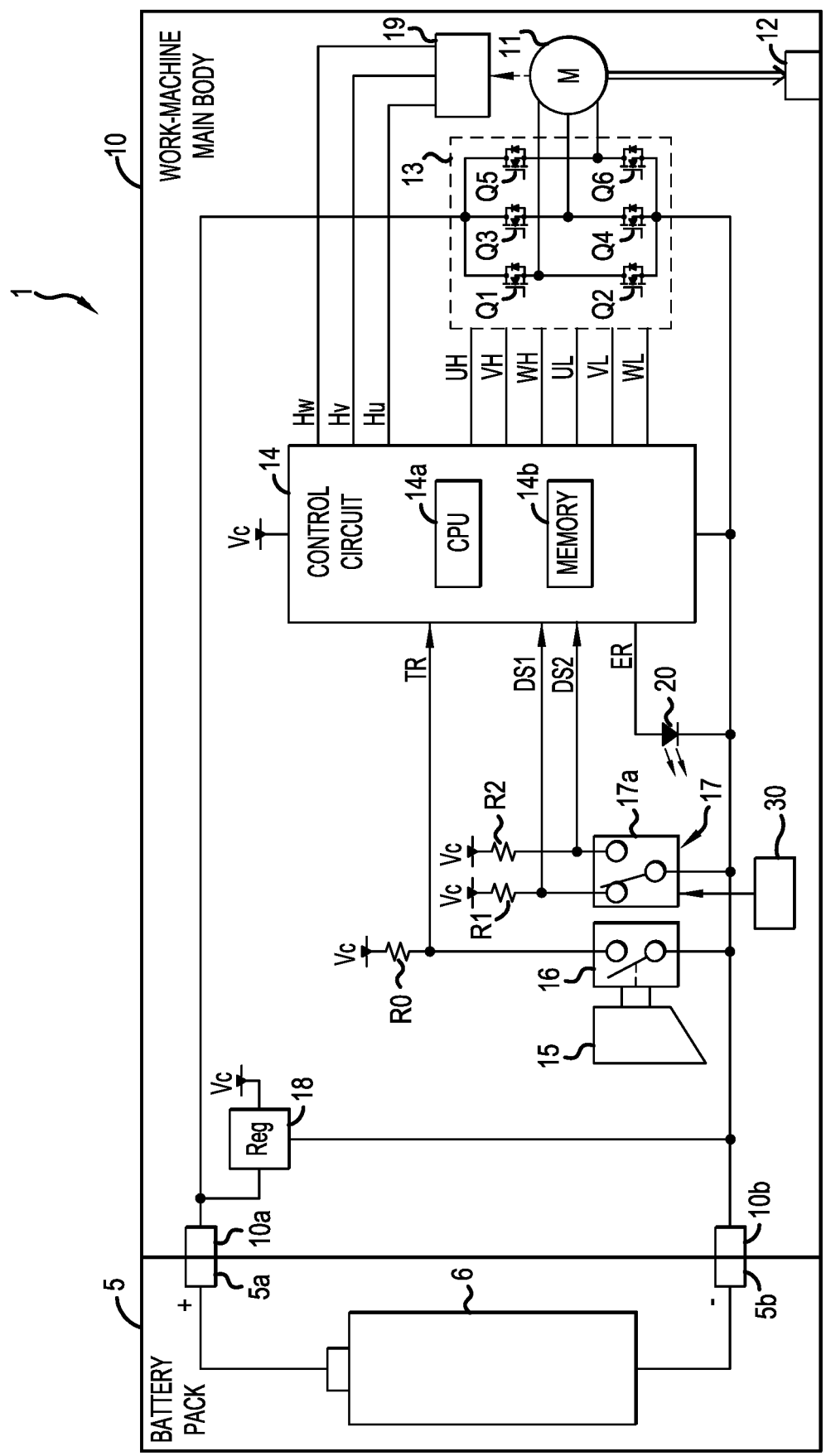
FIG. 1 is an explanatory diagram that shows the electrical configuration of an electric work machine according to a first embodiment of the present teachings.

An electric work machine 1 according to a first embodiment, which is shown in FIG. 1, comprises a work-machine main body 10 and a battery pack 5. The battery pack 5 is mountable on and demountable from the work-machine main body 10. FIG. 1 shows the state in which the battery pack 5 is mounted on the work-machine main body 10.

The battery pack 5 comprises a battery 6, a pack-positive-electrode terminal 5a, and a pack-negative-electrode terminal 5b. The pack-positive-electrode terminal 5a is connected to the positive electrode of the battery 6. The pack-negative-electrode terminal 5b is connected to the negative electrode of the battery 6. The battery 6 may be a rechargeable battery (e.g., one or more lithium-ion battery cells) that is capable of being charged and discharged.

The work-machine main body 10 comprises a main-body, positive-electrode terminal 10a and a main-body, negative-electrode terminal 10b. When the battery pack 5 is mounted on the work-machine main body 10, the pack-positive-electrode terminal 5a is connected to the main-body, positive-electrode terminal 10a, the pack-negative-electrode terminal 5b is connected to the main-body, negative-electrode terminal 10b, and thereby it becomes possible for the work-machine main body 10 to receive electric power of the battery 6 (hereinbelow, called "battery power") from the battery pack 5.

Figure 14:
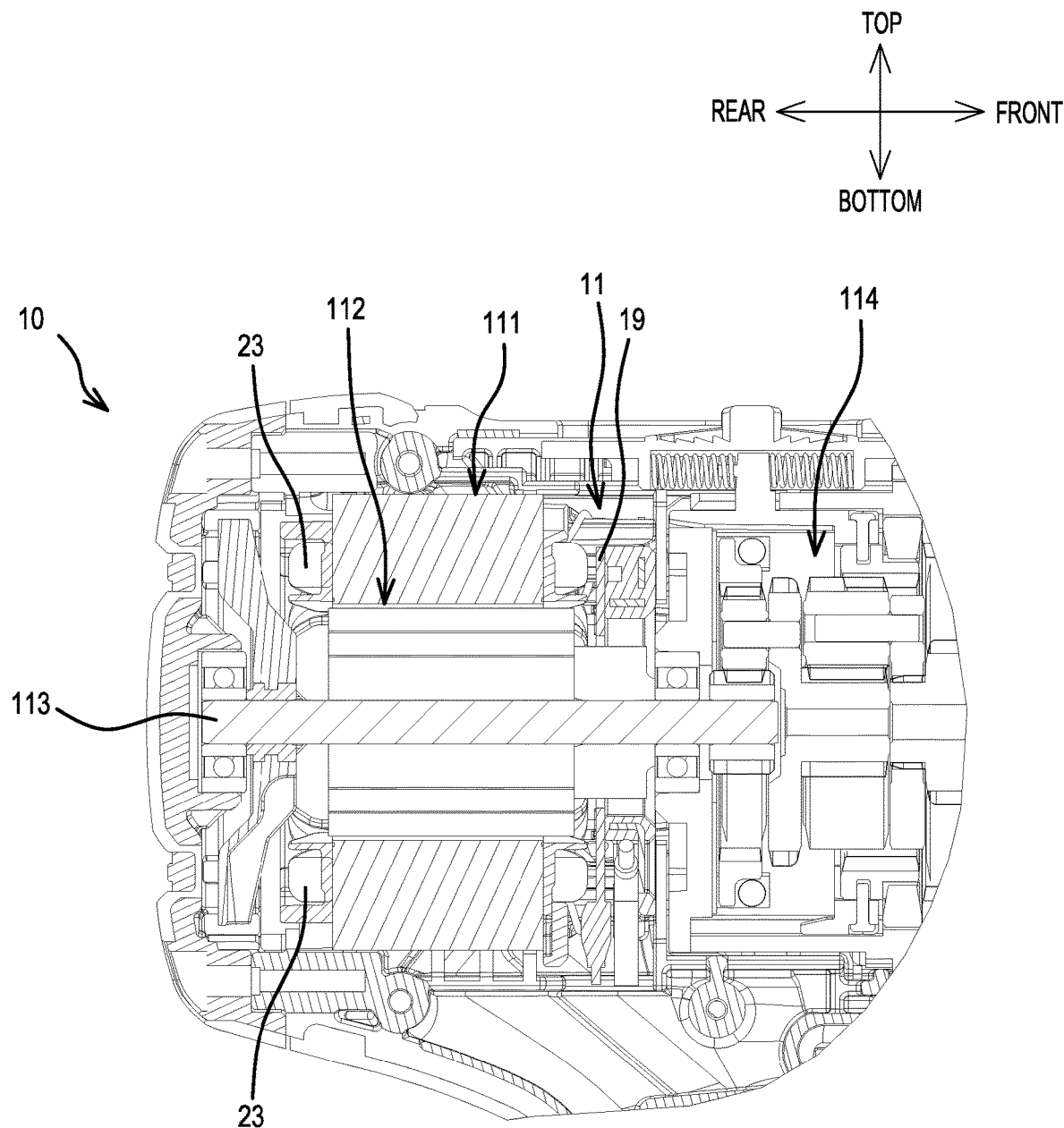
FIG. 14 is a cross-sectional view through a representative electric work machine according to all of the above-mentioned embodiments.

The work-machine main body 10 comprises a motor 11, a tool-drive part (e.g., a spindle and/or a tool chuck) 12, and a motor driver (drive part or drive circuit) 13. As shown in FIG. 14, the motor 11 includes, in particular, a rotor 112 that is rotatably driven relative to a stator 111.

The rotor 112 of the motor 11 is rotationally driven using the drive power that is output from the motor driver 13. The motor 11 of the present embodiment is, for example, a brushless motor.

The motor driver 13 receives the battery power, generates, from that battery power, drive power (in the present embodiment, for example, three-phase electric power) for driving the rotor of the motor 11, and outputs the drive power (current) to coils 23 wound on the stator 111 of the motor 11, as will be further explained below. The rotor 112 of the motor 11 rotates when the coils 23 of the motor 11 receive the drive power (energizing currents) from the motor driver 13.

The rotational-driving force of the rotor 112 of the motor 11 is transmitted to the tool-drive part 12 via a rotary shaft 113 and a transmission mechanism 114, such as a speed-reducing gear transmission, which may comprise one or more stages of planetary gears. A work-output tool (not shown) may be mounted on and/or in the tool-drive part 12. The work-output tool may be fixed to the tool-drive part 12 in a non-demountable manner (i.e. permanently) or may be demountable from the tool-drive part 12, e.g., by providing a tool chuck or other structure for detachably affixing the work-output tool.

The work-output tool is configured such that the function of the electric work machine 1 is achieved by the work-output tool acting on a work target, which is external to the electric work machine 1, in other words, by the work-output tool imparting energy to the work target.

The work-output tool may be, for example: a saw blade configured to rotationally or reciprocatively move in order to cut a material, such as wood material or metal; a rotary blade configured to rotate in order to mow grass or cut small-diameter trees; a bit configured to rotate in order to, e.g., form a hole in a workpiece or tighten a fastener, such as a screw or bolt; or a fan configured to rotate in order to ventilate or perform suction.

That is, the electric work machine 1 according to the first embodiment may be, for example, a circular saw that comprises the above-mentioned saw blade, a brush cutter that comprises the above-mentioned rotary blade, a driver-drill (as shown in FIG. 14), screwdriver, impact driver or impact wrench that comprises the above-mentioned bit, or a blower that comprises the above-mentioned fan.

Referring again to FIG. 1, the work-machine main body 10 comprises a control circuit 14, a trigger-manipulatable (pressable) part (trigger button) 15, a trigger switch 16, a rotational-direction selection part 17, a power-supply circuit 18, a rotational-position detection part (sensor circuit board) 19, and an LED 20.

The power-supply circuit 18 inputs (receives) battery power from the battery pack 5 mounted on the electric work machine 1. The power-supply circuit 18 generates a direct current control voltage Vc by stepping down the voltage of the inputted battery power. Control voltage Vc is supplied to circuits inside the work-machine main body 10, including the control circuit 14. The voltage value of control voltage Vc may be any value, e.g., 5 V.

The trigger-manipulatable part 15 is manipulated (e.g., pressed) by a user of the electric work machine 1. When the trigger-manipulatable part 15 is manipulated (moved) to the ON position (e.g., is manipulated by being pulled), drive power is supplied to the motor 11, as described below, and thereby the rotor of the motor 11 rotates. When the trigger-manipulatable part 15 is manipulated (moved) to the OFF position (e.g., manually released), the supply of drive power to the motor 11 is stopped, as described below, and thereby the rotation of the rotor 112 of the motor 11 stops.

The trigger switch 16 is turned ON and OFF in conjunction with the manipulation of the trigger-manipulatable part 15. Specifically, when the trigger-manipulatable part 15 is manipulated to the OFF position (i.e., when it is not manipulated to the ON position), the trigger switch 16 turns OFF; and when the trigger-manipulatable part 15 is manipulated to the ON position, the trigger switch 16 turns ON.

A first end (terminal) of the trigger switch 16 is connected to a first end (terminal) of resistor R0. A second end (terminal) of the trigger switch 16 is connected to a ground line. The ground line is connected to the main-body, negative-electrode terminal 10b. Control voltage Vc is applied to a second end (terminal) of the resistor R0.

The voltage at the first end of the trigger switch 16 is input, as trigger signal TR, to the control circuit 14. Trigger signal TR indicates the state (ON or OFF) of the trigger switch 16 and, in turn, the state (manipulated ON or manipulated OFF) of the trigger-manipulatable part 15.

When the trigger switch 16 is turned OFF, trigger signal TR becomes an H-level signal, i.e., a signal having a voltage value that is, in essence, equal to the voltage value of control voltage Vc. When the trigger switch 16 is turned ON, trigger signal TR becomes an L-level signal, i.e., a signal having a voltage value that is, in essence, equal to the voltage value of the ground line (in the present embodiment, for example, 0 V).

The rotational-direction selection part (manual switch) 17 is manipulated (e.g., pressed) by the user in order for the user of the electric work machine 1 to select (set) the rotational direction of the motor 11. The rotational-direction selection part 17 comprises a selection manipulatable part 30 (e.g., a forward/reverse change lever or reversing-switch lever), which is manipulated (pressable) by the user. The user can selectively set, by manipulating the selection manipulatable part 30, the rotational direction of the rotor 112 of the motor 11 to either a first rotational direction or a second rotational direction. The first rotational direction may be, for example, forward rotation, i.e., the so-called CW (clockwise) direction. The second rotational direction may be, for example, reverse rotation, i.e., the so-called CCW (counterclockwise) direction.

The rotational-direction selection part 17 also comprises a selection switch 17a, which is operably coupled (linked) to the selection manipulatable part 30. The selection switch 17a comprises a common terminal, a first terminal, and a second terminal. The common terminal is connected to the ground line. The first terminal of the selection switch 17a is connected to a first end (terminal) of resistor R1. Control voltage Vc is applied to a second end (terminal) of the resistor R1. The second terminal of the selection switch 17a is connected to a first end (terminal) of resistor R2. Control voltage Vc is applied to a second end (terminal) of the resistor R2. The selection switch 17a may be, e.g., a so-called single pole double throw switch.

The selection switch 17a is configured such that, in response to the manipulation of the selection manipulatable part 30 by the user, the common terminal is connected to the first terminal or to the second terminal. When the first rotational direction is selected by the selection manipulatable part 30, the common terminal is connected to the first terminal in the selection switch 17a. FIG. 1 shows the state in which the first rotational direction is selected. When the second rotational direction is selected by the selection manipulatable part 30, the common terminal is connected to the second terminal in the selection switch 17a.

The voltage at the first terminal of the selection switch 17a is input, as first setting signal DS1, to the control circuit 14. The voltage at the second terminal of the selection switch 17a is input, as second setting signal DS2, to the control circuit 14. First setting signal DS1 and second setting signal DS2 each (both) indicate the rotational direction of the rotor 112 of the motor 11 set (selected) by the user.

When the first rotational direction is set in (by) the rotational-direction selection part 17, first setting signal DS1 becomes an L-level signal (e.g., a 0 volt signal, which may be represented as "0" in binary code) and second setting signal DS2 becomes an H-level signal (e.g., a 5 volt signal, which may be represented as "1" in binary code). When the second rotational direction is set in (by) the rotational-direction selection part 17, first setting signal DS1 becomes an H-level signal and second setting signal DS2 becomes an L-level signal.

The rotational-position detection part (sensor circuit board) 19 is configured to output rotational-position information (signals) corresponding to (indicating) the momentary rotational position of the rotor 112 of the motor 11. The rotational-position information includes a first position signal Hu, a second position signal Hv, and a third position signal Hw, which are described below.

The rotational-position detection part 19 according to the present embodiment comprises three Hall-effect sensors, namely, a first Hall-effect sensor (not shown), a second Hall-effect sensor (not shown), and a third Hall-effect sensor (not shown). The three Hall-effect sensors are disposed, e.g., on an annular circuit board, around a rotary shaft 113 of the motor 11 that is fixed to the rotor 112 such that the Hall-effect sensors are spaced apart from one another by an electrical angle of 120° with respect to the rotational direction of the rotor 112.

The first Hall-effect sensor outputs first position signal Hu. The second Hall-effect sensor outputs second position signal Hv. The third Hall-effect sensor outputs third position signal Hw. First position signal Hu, second position signal Hv, and third position signal Hw each change in accordance with the relative positional relationship between the momentary rotational position of the rotor 112 and the corresponding Hall-effect sensor. In the present embodiment, the first Hall-effect sensor comprises a Hall-effect device and a signal-processing circuit, which processes an output signal from the Hall-effect device to convert it to a binary digital signal. This binary digital signal is output as first position signal Hu. This applies likewise to the second Hall-effect sensor and the third Hall-effect sensor. The rotational-position information is input (supplied) to the control circuit 14.

Figure 3:
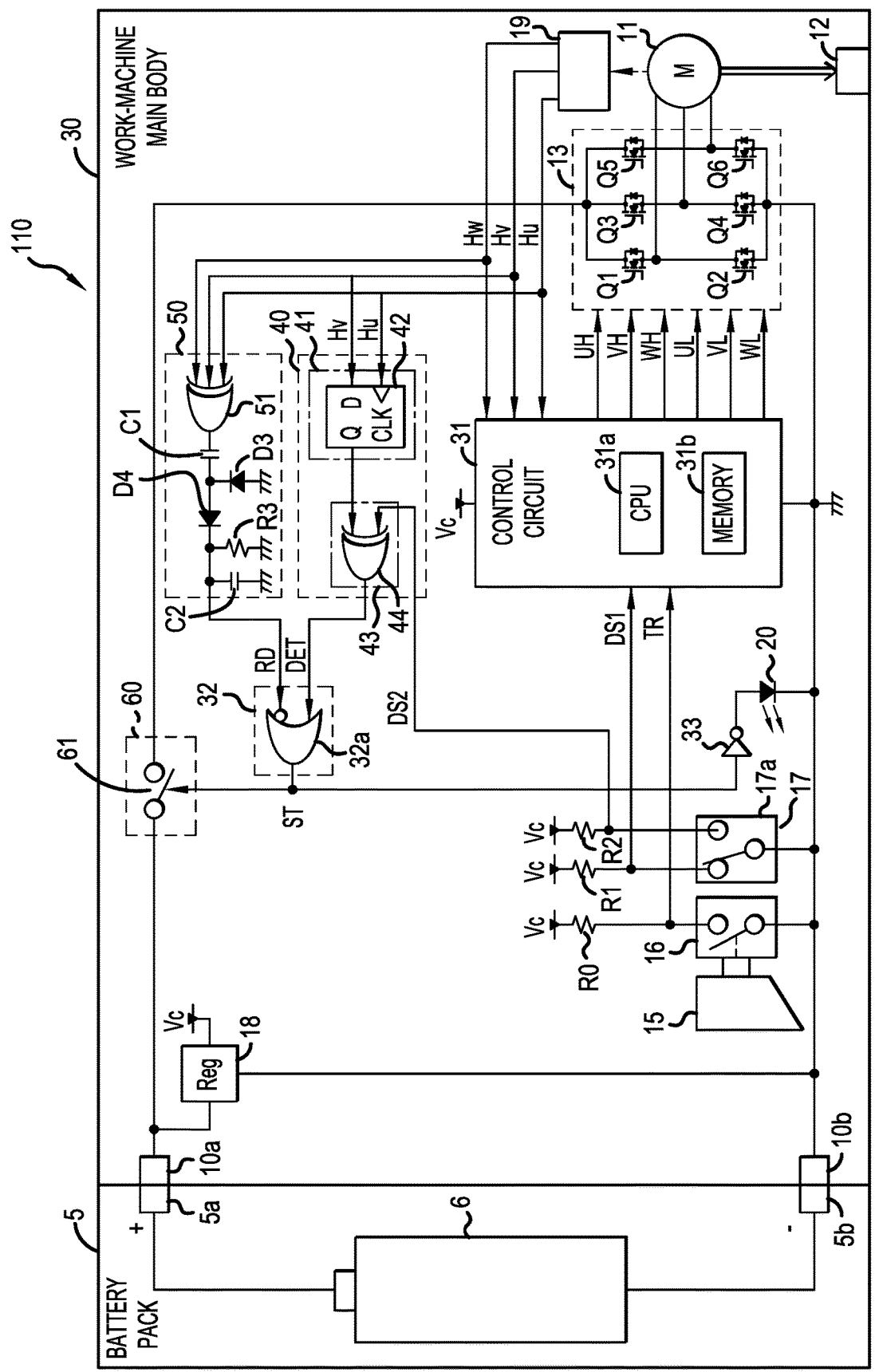
FIG. 3 is an explanatory diagram that shows the electrical configuration of the electric work machine according to a second embodiment of the present teachings.
Figure 4:
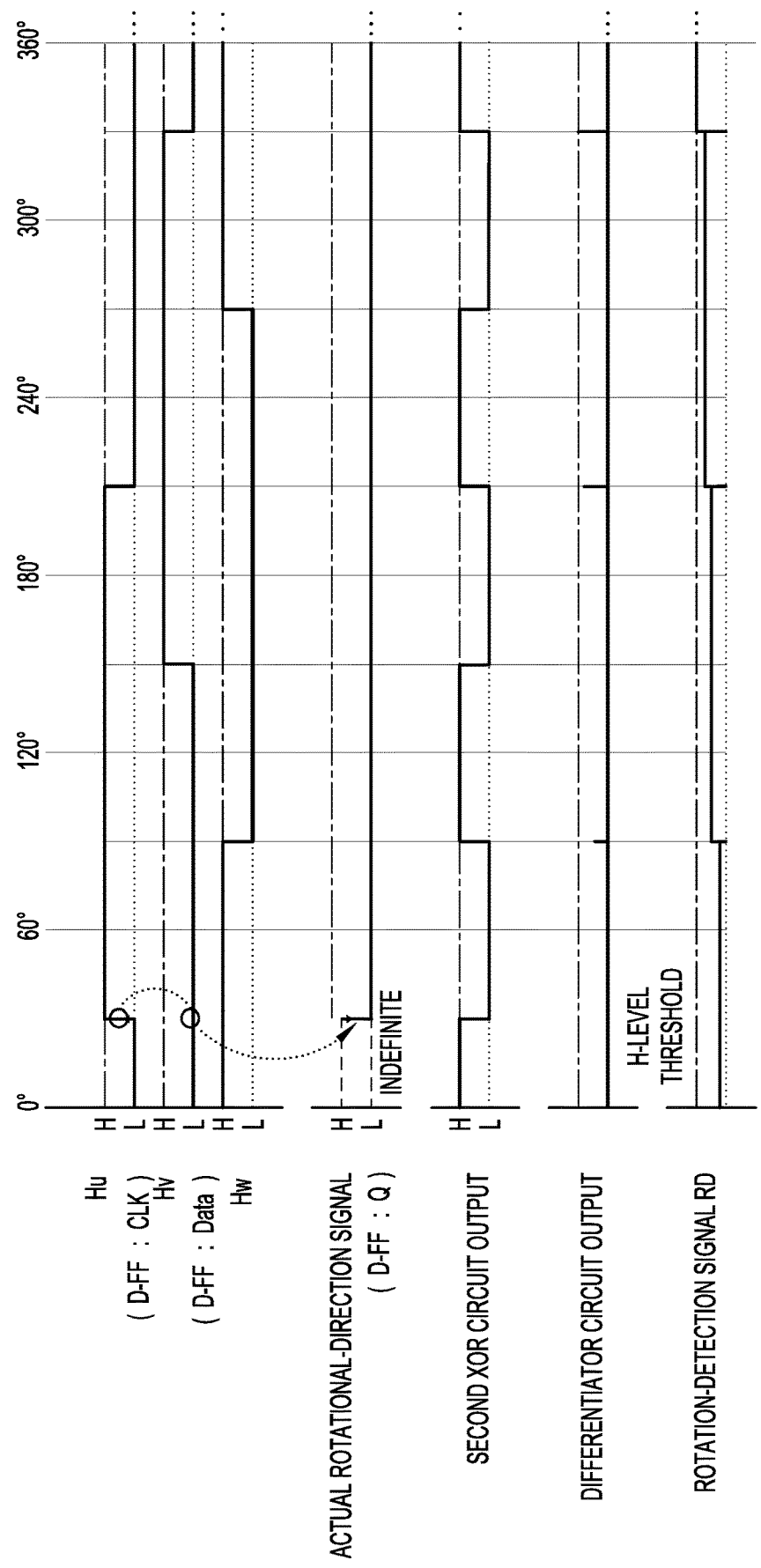
FIG. 4 is an explanatory diagram that shows an operation example of the electric work machine according to the second embodiment and in particular shows an operation example of a situation in which the motor rotates in a first direction.
Figure 5:
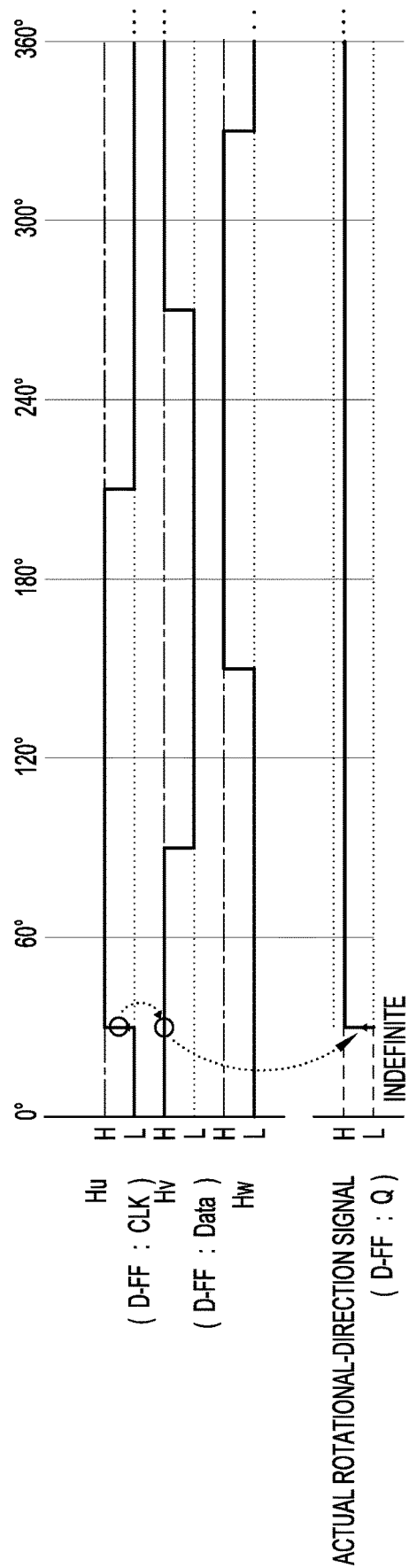
FIG. 5 is an explanatory diagram that shows an operation example of the electric work machine according to the second embodiment and in particular shows an operation example of a situation in which the motor rotates in a second direction.

Examples of rotational-position information (i.e., first position signal Hu, second position signal Hv, and third position signal Hw) are shown in FIG. 4 and FIG. 5. FIG. 4 shows one example of rotational-position information output from the rotational-position detection part 19 when the rotor 112 of the motor 11 is rotating in a first rotational direction selected (set) by the user. FIG. 5 shows one example of rotational-position information output from the rotational-position detection part 19 when the rotor of the motor 11 is rotating in a second (opposite) rotational direction selected (set) by the user. FIG. 4 and FIG. 5 show operation examples of an electric work machine 110 (refer to FIG. 3) according to a second embodiment, which is described below, and this rotational-position information applies likewise to the first embodiment.

It is noted that the abscissa in FIG. 4 and FIG. 5 indicates the amount of rotation (electrical angle) of the rotor 112 of the motor 11 after the trigger switch 16 has been turned ON and the rotor 112 of the motor 11 has started to rotate relative to the stator 111. For example, "0°" on the abscissa indicates the time at which the trigger switch 16 is turned ON and the rotor 112 of the motor 11 has started to rotate. The same applies likewise for the abscissa in FIG. 7 and FIG. 8, which are described below.

As illustrated in FIG. 4 and FIG. 5, first position signal Hu, second position signal Hv, and third position signal Hw change from the L level to the H level at a phase difference of 120° from one another, and each of these change to the L level upon rotation of 180° from the time at which the level changed to the H level. It is noted that, in FIG. 4 and FIG. 5, first position signal Hu changes to the H level at the time at which rotation of 30° from the start of rotation of the rotor 112 has occurred, but this is merely one example. The amount of rotation from the start of rotation until first position signal Hu changes to the H level depends on the rotational position of the rotor 112 of the motor 11 (i.e., the initial position of the rotor) relative to the stator 111 when rotation started and, for example, can be anywhere within the range of 0°-360°.

In the present embodiment, the motor driver 13 comprises a three-phase, full-bridge circuit. That is, the motor driver 13 of the present embodiment comprises six switching devices Q1, Q2, Q3, Q4, Q5, Q6. It is noted that, in the present embodiment, each of the switching devices Q1-Q6 is, for example, a metal-oxide-semiconductor, field-effect transistor (MOSFET).

Each of the switching devices Q1, Q3, Q5 is a so-called high-side switch, and each of the switching devices Q2, Q4, Q6 is a so-called low-side switch. That is, the drain of each of the switching devices Q1, Q3, Q5 is connected to the main-body, positive-electrode terminal 10a, and the source of each of the switching devices Q2, Q4, Q6 is connected to the ground line. The source of the switching device Q1 is connected to the drain of the switching device Q2 as well as to the motor 11. The source of the switching device Q3 is connected to the drain of the switching device Q4 as well as to the motor 11. The source of the switching device Q5 is connected to the drain of the switching device Q6 as well as to the motor 11.

Drive instructions from the control circuit 14 are input to the motor driver 13. The drive instructions in the present embodiment include six drive signals. The six drive signals are first drive signal UH, second drive signal UL, third drive signal VH, fourth drive signal VL, fifth drive signal WH, and sixth drive signal WL. Each of the six drive signals is a binary digital signal.

First drive signal UH is input to the gate of the switching device Q1, and second drive signal UL is input to the gate of the switching device Q2. Third drive signal VH is input to the gate of the switching device Q3, and fourth drive signal VL is input to the gate of the switching device Q4. Fifth drive signal WH is input to the gate of the switching device Q5, and sixth drive signal WL is input to the gate of the switching device Q6. In the motor driver 13, a three-phase drive power (energizing currents) is generated by virtue of each of the switching devices Q1-Q6 being turned ON and OFF in accordance with their corresponding drive signal. The six drive signals are respectively supplied to six coils 23 wound on the stator 111 of the motor 11 to energize the six coils 23 and thereby rotatably drive the rotor of the motor 11. Two of the six coils 23 are shown in FIG. 23.

The control circuit 14 comprises a single-chip microcontroller, which comprises a CPU 14a, memory 14b, and the like. The memory 14b may include various kinds of semiconductor memory such as RAM, ROM, and nonvolatile memory.

Various programs, which are read and executed by the CPU 14a to achieve the various functions of the electric work machine 1, data, and the like are stored in the memory 14b. The programs stored in the memory 14b include a program (algorithm) for a motor-control process shown in FIG. 2, which is described below. The various functions provided by the electric work machine 1 are achieved by the CPU 14a executing the various programs stored in the memory 14b.

It is noted that the various functions of the electric work machine 1 are not limited to software processes as described above, and some or all of those functions may be achieved using hardware in which logic circuits (digital circuits), analog circuits, or the like are combined.

Trigger signal TR, first setting signal DS1, second setting signal DS2, and the rotational-position information are input to the control circuit 14. The control circuit 14 generates drive instructions (i.e., the six drive signals) based on the inputted signals and controls the motor 11 by outputting those drive instructions to the motor driver 13.

When trigger signal TR indicates the H level, i.e., that the trigger switch 16 is turned OFF (hereinbelow, called "trigger OFF"), the control circuit 14 stops the rotation of the rotor 112 of the motor 11 by outputting to the motor driver 13 a drive instruction for stopping the rotation of the rotor 112 of the motor 11. It is noted that the outputting of a drive instruction to stop the rotation of the rotor of the motor 11 may include, for example, setting all six drive signals to the L level in order to turn OFF all six switching devices Q1-Q6.

When trigger signal TR indicates the L level, that is, that the trigger switch 16 is turned ON (hereinbelow, called "trigger ON"), the control circuit 14 acquires the rotational direction set by the user (hereinbelow, called "the set rotational direction") based on either one or both of first setting signal DS1 and second setting signal DS2. Furthermore, by outputting to the motor driver 13 drive instructions (i.e., the six drive signals) to rotate the rotor 112 of the motor 11 in the set (selected) rotational direction, the rotor 112 of the motor 11 is caused to rotate in the set (user-selected) rotational direction.

Figure 7:
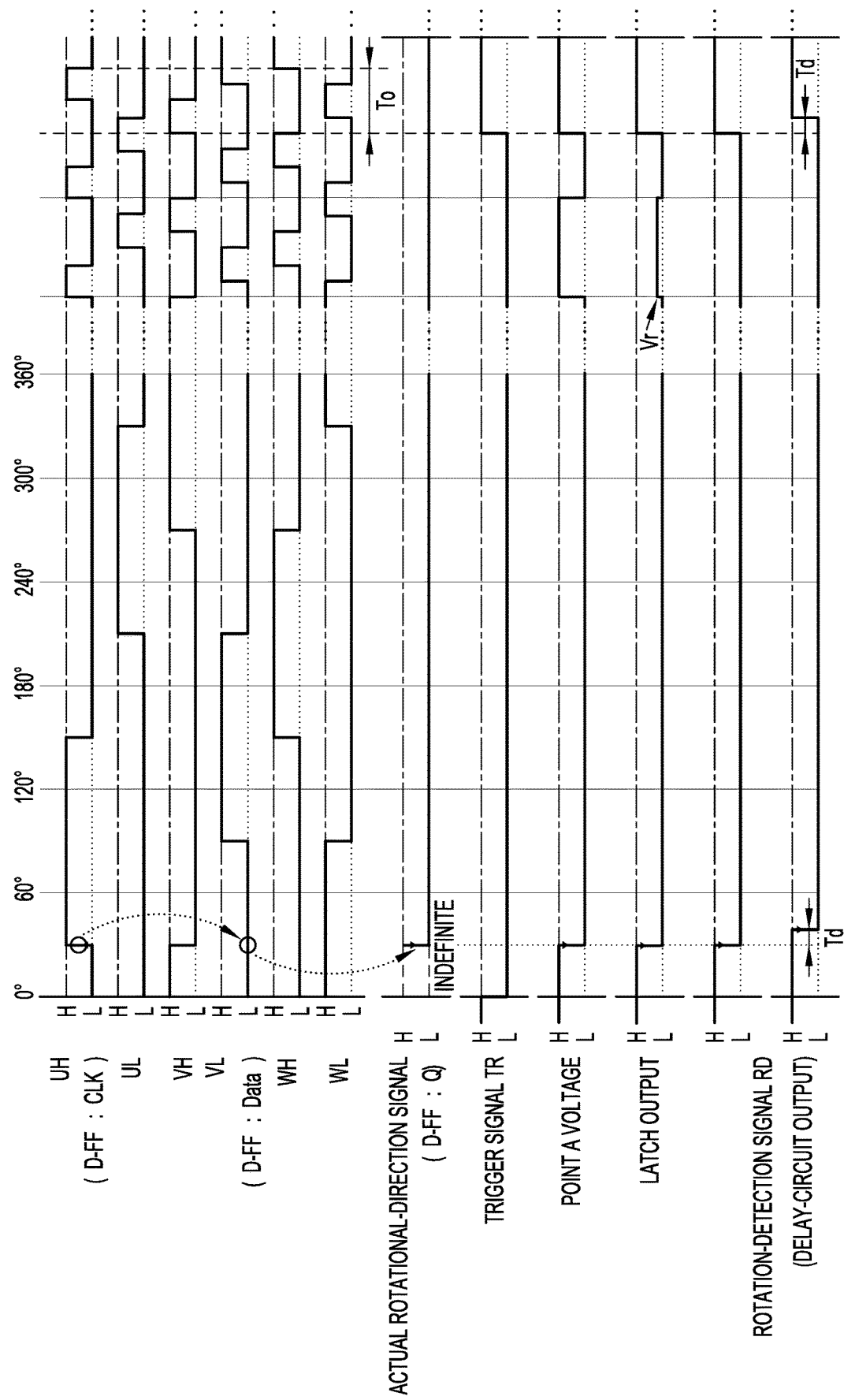
FIG. 7 is an explanatory diagram that shows an operation example of the electric work machine according to the third embodiment and in particular shows an operation example of a situation in which the motor rotates in the first direction.
Figure 8:
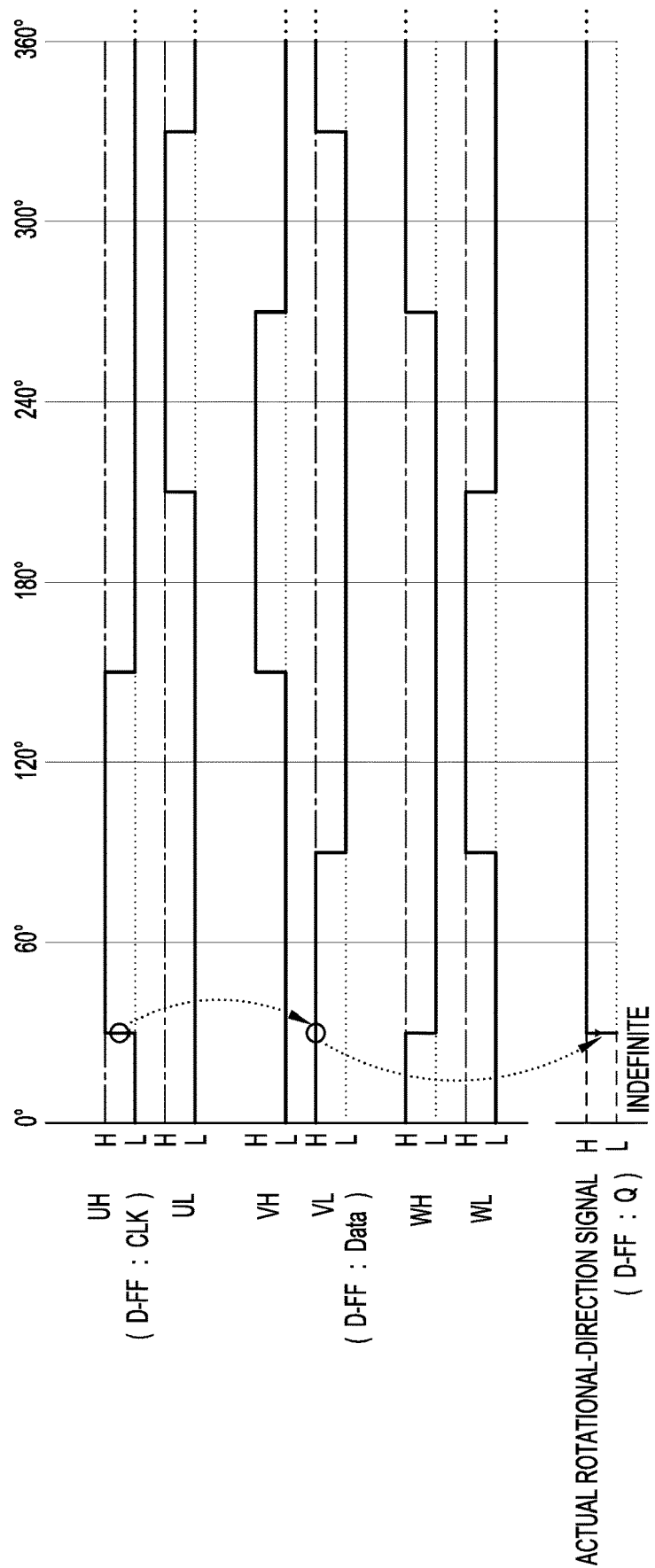
FIG. 8 is an explanatory diagram that shows an operation example of the electric work machine according to the third embodiment and in particular shows an operation example of a situation in which the motor rotates in the second direction.

Examples of drive instructions (i.e., the six drive signals UH, UL, VH, VL, WH, WL) output from the control circuit 14 are shown in FIG. 7 and FIG. 8. FIG. 7 shows one example of drive instructions for rotating the rotor 112 of the motor 11 in the first set rotational direction. FIG. 8 shows one example of drive instructions for rotating the rotor 112 of the motor 11 in the second set (opposite) rotational direction.

FIG. 7 and FIG. 8 show operation examples of an electric work machine 120 (refer to FIG. 6) according to a third embodiment, which is described below, and these six drive signals UH, UL, VH, VL, WH, WL apply likewise to the first embodiment.

In addition, the operation example shown in FIG. 7 corresponds to the rotational-position information shown in FIG. 4, and the operation example shown in FIG. 8 corresponds to the rotational-position information shown in FIG. 5. That is, FIG. 4 and FIG. 7 illustrate that first position signal Hu changes from the L level to the H level at a rotation of 30° from the start of rotation, and, in response to that change, first drive signal UH changes from the L level to the H level and third drive signal VH changes from the H level to the L level. The same applies likewise to FIG. 5 and FIG. 8.

As shown in FIG. 7 and FIG. 8, in the present embodiment, an energization-start time (i.e., the time at which a switching device is changed from OFF to ON) corresponding to a (momentary) rotational position of the rotor of the motor 11 relative to the stator is set for each of the switching devices Q1-Q6. The energization-start times of the switching devices Q1-Q6 are set such that they are offset from one another by a fixed electrical angle (e.g., every 60°).

During the energization interval starting from the corresponding energization-start time until the rotor of the motor 11 rotates by an energization electric angle (e.g., 120°), each of the switching devices Q1-Q6 is continuously or discontinuously (intermittently) turned ON in accordance with whether the corresponding drive signal is continuously or discontinuously (intermittently) set to the H level.

For example, the energization-start time of the switching device Q1 is set to the time at which first position signal Hu changes from the L level to the H level. Consequently, the switching device Q1 turns ON owing to first drive signal UH changing to the H level at the energization-start time, which is when first position signal Hu changes to the H level.

Each of the switching devices Q1-Q6 may be maintained continuously in the ON state during the corresponding (entire) energization interval. However, the control circuit 14 of the present embodiment also controls the motor 11 using PWM (pulse-width modulation). That is, during the corresponding energization interval, instead of being maintained (continuously) at the H level, all six drive signals UH, UL, VH, VL, WH, WL switch periodically (intermittently) from the H level to the L level at a prescribed switching frequency (the so-called PWM frequency). Thereby, during the corresponding energization interval, each of the switching devices Q1-Q6 periodically switches ON and OFF. Furthermore, by controlling the H-level time (i.e., the pulse width) in one period of the switching frequency, the three-phase drive power (energizing currents) supplied to the coils 23 of the motor 11 is controlled (varied), and thereby the rotational speed or the output torque of the rotor 112 of the motor 11 is controlled (varied). The control circuit 14 may control the pulse width in accordance with any PWM method. The control circuit 14 may, for example, detect the amount of pulling manipulation of the trigger-manipulatable part 15 and control (vary) the pulse width in accordance with that amount of pulling manipulation.

(1-2) Direction-Setting Monitoring Function

The control circuit 14 of the present embodiment further comprises the direction-setting monitoring function. The direction-setting monitoring function monitors whether the rotational-direction selection part 17 is functioning normally. In other words, the direction-setting monitoring function monitors whether the rotational direction intended by the user is properly transmitted from the rotational-direction selection part 17 to the control circuit 14 and further whether the proper first setting signal DS1 and second setting signal DS2, which indicate the rotational direction intended by the user, are input to the control circuit 14.

The control circuit 14 achieves the direction-setting monitoring function as, for example, described in the following. That is, as long as the combination of first setting signal DS1 and second setting signal DS2 is proper, the control circuit 14 determines that the rotational-direction selection part 17 is functioning normally. Proper combinations include the combination in which first setting signal DS1 is at the H level and second setting signal DS2 is at the L level and the combination in which first setting signal DS1 is at the L level and second setting signal DS2 is at the H level.

On the other hand, when the combination of first setting signal DS1 and second setting signal DS2 is improper (e.g., a logical inconsistency has arisen), the control circuit 14 determines that the rotational-direction selection part 17 is not functioning properly. In this situation, even if trigger signal TR indicates trigger ON, the control circuit 14 stops the rotor 112 of the motor 11 by outputting a drive instruction to stop the rotor of the motor 11. Improper combinations include combinations in which both first setting signal DS1 and second setting signal DS2 are at the H level or at the L level. These combinations indicate that the rotational direction indicated by first setting signal DS1 and the rotational direction indicated by second setting signal DS2 are inconsistent.

When the combination of first setting signal DS1 and second setting signal DS2 are improper, the control circuit 14 further reports that an error has occurred by outputting an error signal ER to the LED 20 to drive the LED 20. Error signal ER is a signal for turning the LED 20 ON with a prescribed light-ON pattern and color. The light-ON pattern may be any pattern that will suitably warn/notify the user that the rotational-direction selection part 17 is not functioning normally. For example, the light-ON pattern may be configured to flash ON and OFF with fixed periods or may be configured to turn ON continuously for a fixed time and then turn OFF after the fixed time has elapsed.

The control circuit 14 may execute the direction-setting monitoring function with any timing and, in the present embodiment, executes the direction-setting monitoring function, for example, when the trigger switch 16 has been turned ON, that is, when the trigger-manipulatable part 15 has been manipulated (depressed) to the ON position.

(1-3) Motor-Control Process

Figure 2:
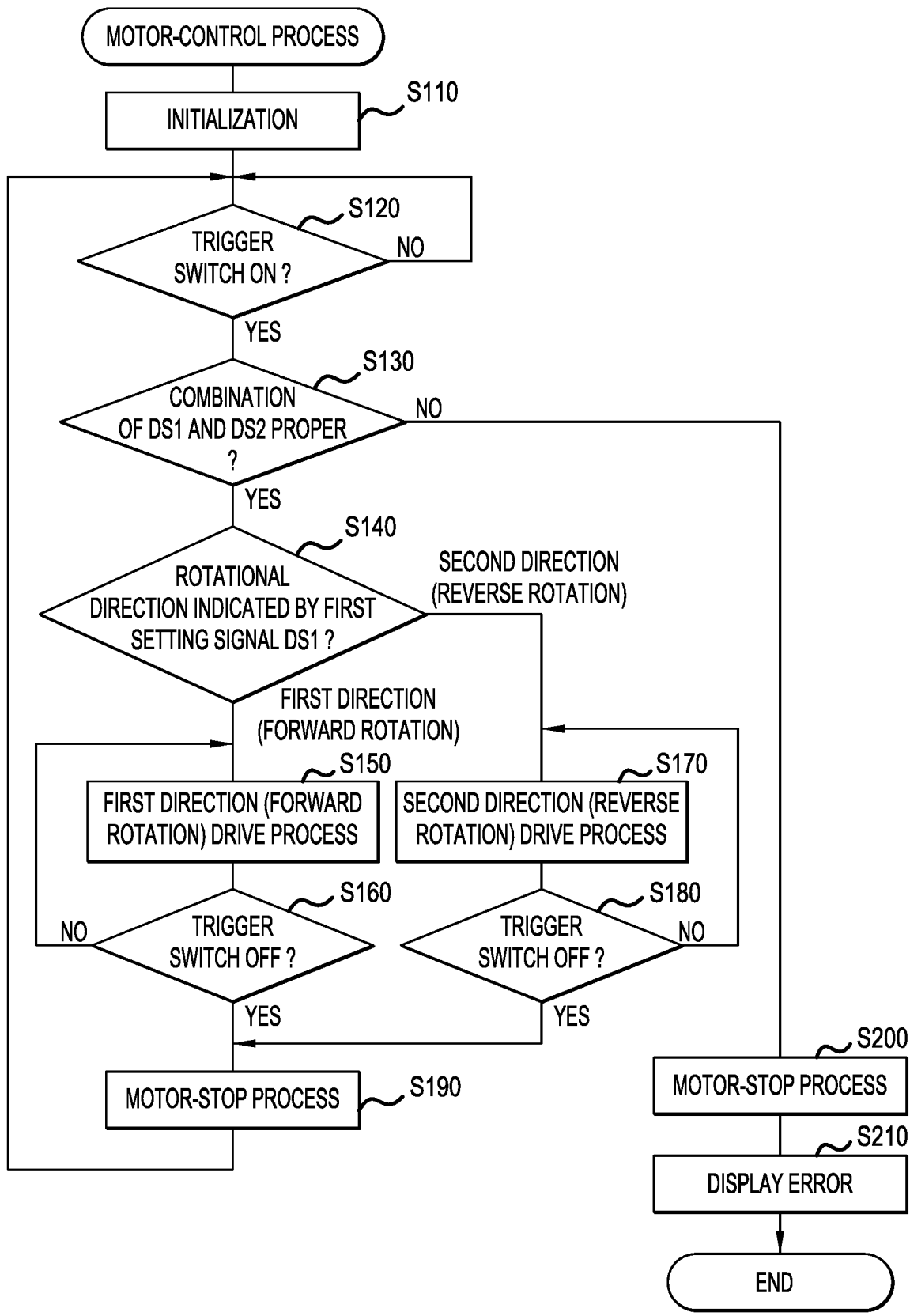
FIG. 2 is a flow chart of a motor-control process according to the first embodiment.

The motor-control process executed by the control circuit 14 (more specifically, the CPU 14a) will now be explained, with reference to FIG. 2. When the CPU 14a starts up by virtue of being supplied with control voltage Vc, it executes the motor-control process. The direction-setting monitoring function described above is achieved by the CPU 14a executing the motor-control process.

When the motor-control process starts, the CPU 14a performs initialization in S110. For example, setting each port in the CPU 14a is included in the initialization.

In S120, it is determined, based on trigger signal TR, whether the trigger switch 16 is ON. While the trigger switch 16 is OFF, the determination in S120 is performed repetitively. When the trigger switch 16 is turned ON, the process proceeds to S130.

In S130, it is determined whether the combination of first setting signal DS1 and second setting signal DS2 is proper. When the combination of first setting signal DS1 and second setting signal DS2 is proper, the process advances to S140.

In S140, the rotational direction indicated by first setting signal DS1 is determined. When first setting signal DS1 indicates the first direction (forward rotation), the process proceeds to S150. It is noted that, in S140, the rotational direction indicated by second setting signal DS2 may be determined. In S150, a drive instruction to rotate the rotor 112 of the motor 11 in the first rotational direction is generated and output to the motor driver 13, thereby causing the rotor 112 of the motor 11 to rotate in the first rotational direction.

In S160, it is determined whether the trigger switch 16 is OFF. When the trigger switch 16 is not OFF, the process proceeds to S150. When the trigger switch 16 is OFF, the process proceeds to S190.

In S190, a motor-stop process is executed. Specifically, a drive instruction to stop the rotation of the rotor 112 of the motor 11 is generated and output to the motor driver 13, thereby stopping the rotation of the rotor 112 of the motor 11. In S190, after the rotation of the rotor 112 of the motor 11 has been stopped, the process proceeds to S120.

In S140, when first setting signal DS1 indicates the second rotational direction (reverse rotation), the process proceeds to S170. In S170, a drive instruction to rotate the rotor 112 of the motor 11 in the second rotational direction is generated and output to the motor driver 13, thereby causing the rotor 112 of the motor 11 to rotate in the second rotational direction.

In S180, it is determined whether the trigger switch 16 is OFF. When the trigger switch 16 is not OFF, the process proceeds to S170. When the trigger switch 16 is OFF, the process proceeds to S190, in which the motor-stop process is executed.

In S130, when the combination of first setting signal DS1 and second setting signal DS2 is improper, the process proceeds to S200. In S200, the motor-stop process is executed the same as in S190. In S200, after the rotation of the rotor 112 of the motor 11 has been stopped, the process proceeds to S210.

In S210, an error is displayed. Specifically, error signal ER is output to the LED 20, thereby causing the LED 20 to turn ON with a light-ON pattern corresponding to error signal ER.

(1-4) Effects of the First Embodiment

According to the first embodiment as explained above, when an abnormality (setting-signal inconsistency), in which the rotational direction indicated by first setting signal DS1 and the rotational direction indicated by second setting signal DS2 are inconsistent, occurs owing to a fault (failure, defect) in the rotational-direction selection part 17 or some other type of cause, the rotation of the rotor 112 of the motor 11 is stopped or prevented. Consequently, when a setting-signal inconsistency arises, it becomes possible to inhibit (prevent) the rotor 112 of the motor 11 from rotating in a rotational direction that differs from the rotational direction that the user of the electric work machine 1 set by manipulating the rotational-direction selection part 17 (i.e., from rotating in the rotational direction that the user did not intend).

In addition, in the first embodiment, the control circuit 14 determines whether a setting-signal inconsistency has arisen based on first setting signal DS1 and second setting signal DS2, which are input to the control circuit 14. Furthermore, when it is determined that a setting-signal inconsistency has arisen, the control circuit 14 stops or prevents the rotation of the rotor 112 of the motor 11 by either outputting a drive instruction or by stopping the output of a drive instruction such that the rotor 112 of the motor 11 stops or is not rotatably driven. Consequently, when a setting-signal inconsistency has arisen, the stopping or prevention of the rotation of the rotor 112 of the motor 11 can be achieved with a simple configuration.

As was noted above, the motor driver 13 corresponds to one example of a drive part in the present disclosure.

2. Second Embodiment

The principal points of difference between the electric work machine 110 of the second embodiment and the electric work machine 1 (refer to FIG. 1) of the first embodiment are explained below, with reference to FIG. 3 to FIG. 5. In FIG. 3, reference symbols that are the same as those in FIG. 1 indicate structural elements that are identical to those in FIG. 1, and the preceding explanations thereof are incorporated by reference into the present embodiment.

In the electric work machine 110 of the second embodiment shown in FIG. 3, control circuit 31 differs from the control circuit 14 of the first embodiment in the points below. That is, second setting signal DS2 is not input to the control circuit 31, and the control circuit 31 does not have the direction-setting monitoring function. Accordingly, the motor-control process executed by the control circuit 31 of the second embodiment does not include S130, S200, and S210 in the motor-control process of the first embodiment shown in FIG. 2. In the second embodiment, the direction-setting monitoring function is achieved by a determination circuit 40, a rotation-detection circuit 50, a disabling circuit 32, and a motor-stop circuit 60, which are described below.

As shown in FIG. 3, the electric work machine 110 comprises the motor-stop circuit 60. The motor-stop circuit 60 according to the second embodiment comprises a switch 61. The switch 61 is provided in the electric-current path through which battery power from the main-body, positive-electrode terminal 10a is supplied to the motor driver 13; the switch 61 closes and opens the electric-current path. The switch 61 turns ON or OFF in accordance with a continuity-control signal ST, which is described below. When the switch 61 is ON, the electric-current path is closed (conductive); and when the switch 61 is OFF, the electric-current path is open (not conductive).

As shown in FIG. 3, the electric work machine 110 comprises the determination circuit 40. The determination circuit 40 comprises a rotational-direction detection circuit 41 and a determination-execution circuit 43.

The rotational-direction detection circuit 41 detects the actual rotational direction, which is the actual rotational direction of the rotor of the motor 11. In the second embodiment, the rotational-direction detection circuit 41 detects the actual rotational direction of the rotor based on the rotational-position information. Specifically, the rotational-direction detection circuit 41 detects the actual rotational direction based on any two of first position signal Hu, second position signal Hv, and third position signal Hw (in the present embodiment, for example, based on first position signal Hu and second position signal Hv) output by the rotational-position detection part (sensor circuit board) 19.

The rotational-direction detection circuit 41 comprises, for example, a D-type flip-flop 42 (hereinbelow, called "D-FF"). In the D-FF 42, first position signal Hu is input to a clock-input terminal (pin), and second position signal Hv is input to a data-input terminal (pin). An output signal of the D-FF 42 is input to the determination-execution circuit 43. The output signal of the D-FF 42 indicates the actual rotational direction of the rotor and is called the "actual-rotational-direction signal" hereinbelow.

When the rotor 112 of the motor 11 is rotating in the first rotational direction, as illustrated in FIG. 4, second position signal Hv is at the L level when first position signal Hu changes to the H level. Consequently, when the rotor 112 of the motor 11 is rotating in the first rotational direction, the actual-rotational-direction signal is at the L level. When the rotor 112 of the motor 11 is rotating in the second rotational direction, as illustrated in FIG. 5, second position signal Hv is at the H level when first position signal Hu changes to the H level. Consequently, when the rotor 112 of the motor 11 is rotating in the second direction, the actual-rotational-direction signal is at the H level.

The determination-execution circuit 43 determines (computes) whether the actual rotational direction detected by the rotational-direction detection circuit 41 and the set rotational direction set by the user are consistent and outputs the result thereof. The actual-rotational-direction signal and second setting signal DS2 are input to the determination-execution circuit 43.

The determination-execution circuit 43 comprises, for example, a first XOR circuit 44. The first XOR circuit 44 computes the exclusive OR of the actual-rotational-direction signal and second setting signal DS2 and outputs the computation result thereof. The computation result output from the first XOR circuit 44 is called "determination signal DET" hereinbelow. Determination signal DET indicates whether the set rotational direction and the actual rotational direction are consistent. When the set rotational direction and the actual rotational direction are consistent, determination signal DET is at the H level. For example, when the set rotational direction is the first direction and the actual rotational direction is also the first direction, second setting signal DS2 is at the H level and the actual-rotational-direction signal is at the L level and, consequently, determination signal DET is at the H level. When the set rotational direction and the actual rotational direction are inconsistent, determination signal DET is at the L level.

As shown in FIG. 3, the electric work machine 110 comprises the rotation-detection circuit 50. The rotation-detection circuit 50 detects whether the rotor 112 of the motor 11 is rotating. In the second embodiment, the rotation-detection circuit 50 detects, based on the rotational-position information, whether the rotor 112 of the motor 11 is rotating.

It is noted that, because the rotor 112 of the motor 11 rotates in accordance with first setting signal DS1, it can be said that the actual rotational direction is the rotational direction that corresponds to first setting signal DS1. Thereby, it can be understood that the determination circuit 40, in essence, determines whether the rotational direction indicated by first setting signal DS1 and the rotational direction indicated by second setting signal DS2 are consistent and outputs the determination result thereof as determination signal DET.

The rotation-detection circuit 50 comprises, for example, a second XOR circuit 51. First position signal Hu, second position signal Hv, and third position signal Hw are input to the second XOR circuit 51. The second XOR circuit 51 computes the exclusive OR of the three inputted signals and outputs the computation result thereof.

When the rotor 112 of the motor 11 rotates in the first direction, as illustrated in FIG. 4, the logic state of the output signal of the second XOR circuit 51 inverts with every rotation of 60°—in greater detail, every time the rotational-position information changes.

An output terminal of the second XOR circuit 51 is connected to a first end (terminal) of capacitor C1. A second end (terminal) of the capacitor C1 is connected to the cathode of diode D3 and to the anode of diode D4. The anode of the diode D3 is connected to the ground line. The cathode of the diode D4 is connected to a first end (terminal) of resistor R3 and a first end (terminal) of capacitor C2. A second end (terminal) of the resistor R3 and a second end (terminal) of the capacitor C2 are connected to the ground line. The voltage at the cathode of the diode D4 is output from the rotation-detection circuit 50 as rotation-detection signal RD, which indicates whether the rotor 112 of the motor 11 is rotating.

The capacitor C1 and the diode D3 function as a differentiator circuit. That is, as illustrated in FIG. 4, every time the output signal of the second XOR circuit 51 changes to the H level, the output-voltage value of the differentiator circuit (i.e., the voltage value at the second end of the capacitor C1) increases suddenly to a peak value and subsequently decreases to 0 V. The peak value depends on the charging-voltage value of the capacitor C2. According to such a configuration, every time the output signal of the second XOR circuit 51 changes to the H level, the charging-voltage value of the capacitor C2 keeps on rising owing to the output voltage from the differentiator circuit, and thereby the charging-voltage value thereof, i.e., the voltage value of rotation-detection signal RD, becomes an H-level threshold or higher. That is, rotation-detection signal RD is at the H level (more specifically, the level at which it is possible to be inverted to the L level in an input stage of an OR circuit 32a, which is described below). In the example shown in FIG. 4, rotation-detection signal RD changes to the H level when the rotor 112 of the motor 11 has rotated to 330°.

When the rotor 112 of the motor 11 is stopped, the output signal of the second XOR circuit 51 does not change, and consequently the capacitor C2 is not charged and rotation-detection signal RD is maintained at the L level. Rotation-detection signal RD being at the H level means that the rotor 112 of the motor 11 is rotating.

As shown in FIG. 3, the electric work machine 110 comprises the disabling circuit 32. The disabling circuit 32 outputs the above-mentioned continuity-control signal ST. While rotation of the rotor 112 of the motor 11 is being detected by the rotation-detection circuit 50, the disabling circuit 32 outputs a continuity-control signal ST corresponding to the determination signal DET.

That is, when determination signal DET indicates that the set rotational direction and the actual rotational direction are consistent, a signal at the H level is output as continuity-control signal ST, and thereby the switch 61 is turned ON (is conductive). On the other hand, when determination signal DET indicates that the set rotational direction and the actual rotational direction are inconsistent, an L-level signal is output as continuity-control signal ST, and thereby the switch 61 is turned OFF (is not conductive).

When the rotation of the rotor 112 of the motor 11 is not being detected by the rotation-detection circuit 50, the disabling circuit 32 outputs continuity-control signal ST at the H level, regardless of whether or not the set rotational direction and the actual rotational direction are consistent, and thereby the switch 61 is turned ON. That is, when the rotor 112 of the motor 11 is not rotating, the supply of electric power to the motor 11 is enabled, regardless of the determination result of the determination circuit 40.

The disabling circuit 32 of the second embodiment comprises, for example, the OR circuit 32a. Rotation-detection signal RD and determination signal DET are input to the OR circuit 32a. The logic state of rotation-detection signal RD is inverted and then input. Furthermore, the output signal of the OR circuit 32a is output as continuity-control signal ST. Owing to such a configuration, when rotation-detection signal RD is at the L level (i.e., when the rotor 112 of the motor 11 is not rotating), the output signal of the OR circuit 32a is at the H level (i.e., continuity-control signal ST is at the H level) regardless of determination signal DET, and thereby the switch 61 is turned ON. On the other hand, when rotation-detection signal RD is at the H level (i.e., when the rotor 112 of the motor 11 is rotating), the output signal of the OR circuit 32a changes (i.e., continuity-control signal ST changes) in accordance with the determination signal DET. When determination signal DET changes to the L level owing to the fact that the determination-execution circuit 43 has determined that the rotational directions are inconsistent, continuity-control signal ST changes to the L level, and thereby the switch 61 is turned OFF. When the switch 61 is turned OFF, the battery power is no longer supplied to the motor driver 13, and thereby the rotation of the rotor 112 of the motor 11 is stopped or prevented.

The disabling circuit 32 is provided in order to, while rotation of the rotor of the motor 11 is not being detected, disable the function that turns the switch 61 OFF in accordance with determination signal DET.

Continuity-control signal ST is input to the motor-stop circuit 60 and, after its logic state is inverted by an inverter circuit 33, is input to the LED 20. Consequently, when continuity-control signal ST changes to the L level and the switch 61 is turned OFF, the LED 20 is turned ON, and thereby the fact that an error has occurred is reported.

According to the second embodiment described in detail above, the same effects as those in the first embodiment are obtained in relation to the functions and the like achieved by the same structural elements as those in the first embodiment.

Furthermore, in the electric work machine 110 of the second embodiment, the determination of whether a setting-signal inconsistency has occurred and whether the stoppage of the rotation of the rotor of the motor 11 when a setting-signal inconsistency has occurred are achieved by the determination circuit 40 and the motor-stop circuit 60 (i.e., by hardware processing) that are provided separately from the control circuit 31. Consequently, even if an abnormality were to occur in the control circuit 31, the rotation of the rotor 112 of the motor 11 could still be appropriately stopped or prevented by the hardware processing when a setting-signal inconsistency has occurred.

In addition, in the electric work machine 110, while rotation of the rotor 112 of the motor 11 is not being detected by the rotation-detection circuit 50, determination signal DET from the determination circuit 40 is disabled by the disabling circuit 32. Consequently, it becomes possible to enable the determination result produced by the determination circuit 40 at an appropriate time.

It is noted that the motor-stop circuit 60 corresponds to one example of a stop circuit in the present disclosure. The rotational-position detection part 19 corresponds to one example of a position-information output part in the present disclosure.

3. Third Embodiment

Figure 6:
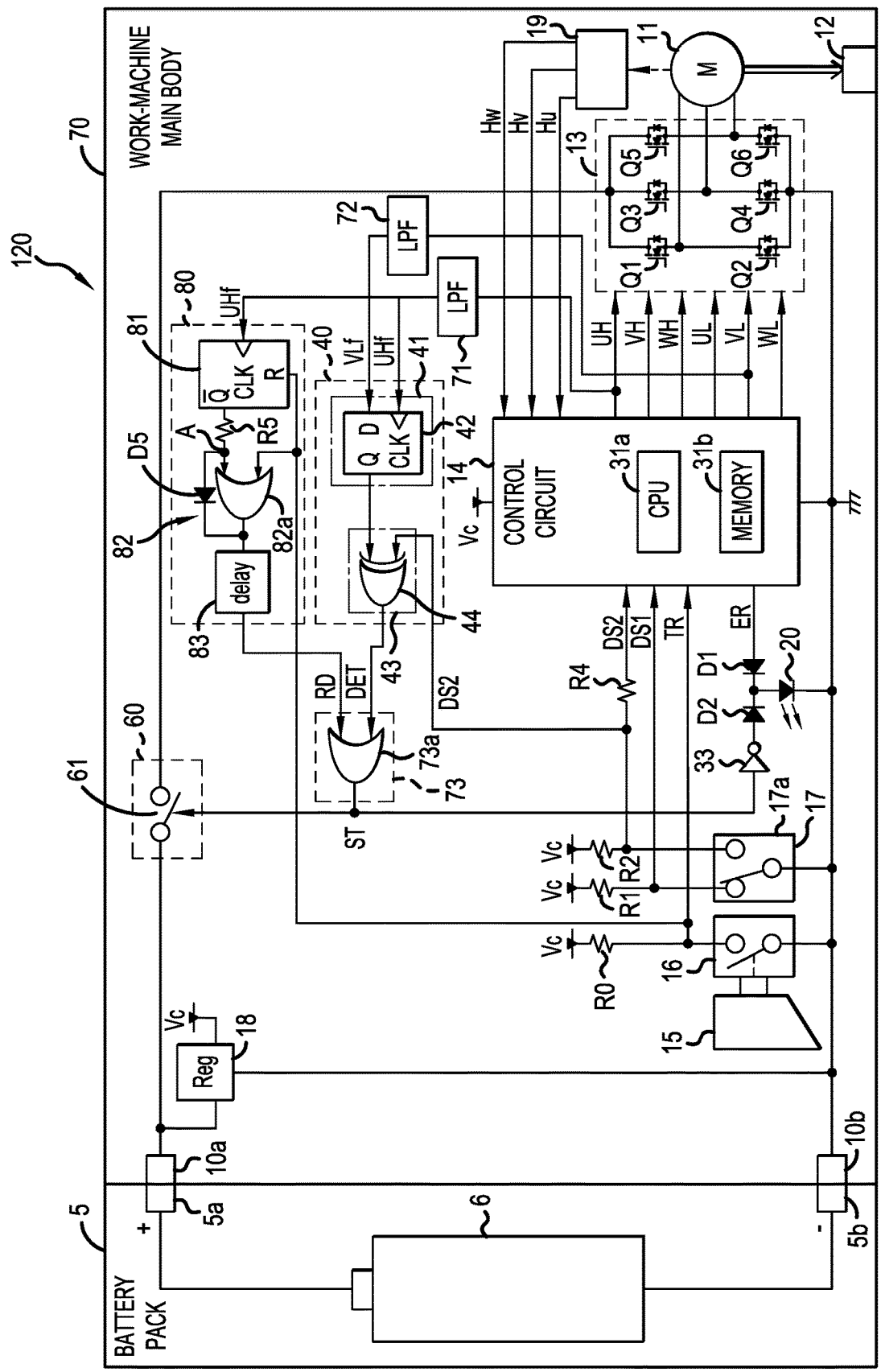
FIG. 6 is an explanatory diagram that shows the electrical configuration of the electric work machine according to a third embodiment of the present teachings.

The principal points of difference between the electric work machine 120 of the second embodiment, on the one hand, and the electric work machine 1 (refer to FIG. 1) of the first embodiment and the electric work machine 110 (refer to FIG. 3) of the second embodiment, on the other hand, are explained below, with reference to FIG. 6 to FIG. 8. In FIG. 6, reference symbols that are the same as those in FIG. 1 and FIG. 3 indicate structural elements that are identical to those in FIG. 1 and FIG. 3, and preceding explanations thereof are incorporated by reference into the present embodiment.

In the electric work machine 120 of the third embodiment shown in FIG. 6, the rotational-direction detection circuit 41 detects the actual rotational direction based on the drive instructions. That is, any two of the six drive signals UH, UL, VH, VL, WH, WL are input to the D-FF 42 via respective LPFs (low-pass filters).

Specifically, for example, first filter signal UHf, i.e., first drive signal UH that has passed through a first LPF 71, is input to the clock-input terminal (pin) of the D-FF 42. Fourth filter signal VLf, i.e., fourth drive signal VL that has passed through a second LPF 72, is input to the data-input terminal (pin) of the D-FF 42. It is noted that, in FIG. 7, first drive signal UH can be regarded, in essence, as also indicating first filter signal UHf, and fourth drive signal VL can be regarded, in essence, as also indicating fourth filter signal VLf.

The first LPF 71 attenuates signal components of frequencies in the inputted first drive signal UH that are higher than a first cutoff frequency of that signal and outputs the first filter signal UHf. The first cutoff frequency is, for example, lower than the above-mentioned switching frequency (PWM frequency) and higher than a maximum commutation frequency.

The commutation frequency is a frequency at which the direction of the electric current supplied to the motor 11 changes in accordance with the drive instructions. In the present embodiment, as illustrated in FIG. 7, some of the drive instructions change every time the motor 11 rotates 60°, and thereby the direction of the electric current supplied from the motor driver 13 to the motor 11 changes. Accordingly, in the third embodiment, the frequency corresponding to the time needed for the rotor 112 to rotate 60°, i.e., the inverse of that time, is the commutation frequency. In the third embodiment, a maximum rotational speed of the rotor 112 is set, and the control circuit 14 is configured to rotate the rotor 112 of the motor 11 at a speed that is the maximum rotational speed thereof or lower. The above-mentioned maximum commutation frequency means the commutation frequency when the rotor 112 of the motor 11 is being rotated at the maximum rotational speed.

The second LPF 72 attenuates the signal components in the inputted fourth drive signal VL in which the frequency is higher than a second cutoff frequency and outputs the fourth filter signal VLf. The same as with the first cutoff frequency, the second cutoff frequency is lower than the switching frequency (PWM frequency) and higher than the maximum commutation frequency. The second cutoff frequency may be the same as or different from the first cutoff frequency.

As illustrated in FIG. 7, when the rotor 112 of the motor 11 is rotating in the first rotational direction, the fourth filter signal VLf is at the L level when the first filter signal UHf changes to the H level. Consequently, when the rotor 112 of the motor 11 is rotating in the first rotational direction, the actual-rotational-direction signal is at the L level, the same as in the second embodiment. As illustrated in FIG. 8, when the rotor 112 of the motor 11 is rotating in the second rotational direction, the fourth filter signal VLf is at the H level when the first filter signal UHf changes to the H level. Consequently, when the rotor 112 of the motor 11 is rotating in the second rotational direction, the actual-rotational-direction signal is at the H level, the same as in the second embodiment.

A rotation-detection circuit 80 of the third embodiment detects whether or not the rotor 112 of the motor 11 is rotating, the same as the rotation-detection circuit 50 of the second embodiment does. However, the rotation-detection circuit 80 of the third embodiment detects whether or not the rotor of the motor 11 is rotating based on a drive instruction. More specifically, detection is performed based on, for example, one of the six drive signals. In the third embodiment, detection of whether the rotor 112 of the motor 11 is rotating is performed based on, for example, the first drive signal UH (in greater detail, based on the first filter signal UHf after the first drive signal UH has passed through the first LPF 71) output by the rotational-position detection part (sensor circuit board) 19.

As shown in FIG. 6, the rotation-detection circuit 80 comprises a T-type flip-flop 81 (hereinbelow, called "T-FF"), a latch circuit 82, and a delay circuit 83. In the T-FF 81, the first filter signal UHf is input to the clock-input terminal (pin), and trigger signal TR is input to the reset terminal (pin).

As illustrated in FIG. 7, the T-FF 81 is configured to output an output signal at the H level while the trigger signal TR, which is being input to the reset terminal, is at the H level (i.e., while the trigger switch 16 is turned OFF). When the trigger switch 16 is turned ON and the trigger signal TR, which is being input to the reset terminal, changes to the L level, while at that L level, the output signal of the T-FF 81 changes in accordance with the inputted first filter signal UHf.

That is, as illustrated in FIG. 7, after the trigger signal TR transitions to the L level and the rotation of the rotor 112 of the motor 11 has started, when the first filter signal UHf changes to the H level at the point in time when the rotor 112 has rotated 30°, the output signal of the T-FF 81 changes to the L level. Subsequently, when the rotor 112 has rotated 360° and the first filter signal UHf once again changes to the H level, the output signal of the T-FF 81 changes to the H level. That is, every time the first filter signal UHf changes from the L level to the H level, the logic level of the output signal of the T-FF 81 switches in an alternating manner.

When the trigger switch 16 is turned OFF and the trigger signal TR changes to the H level by virtue of the user manipulating (releasing) the trigger to the OFF position during rotation of the rotor 112 of the motor 11, the output signal of the T-FF 81 is maintained at the H level, regardless of a change in the first filter signal UHf.

The change in the output signal of the T-FF 81 to the L level means that the rotor of the motor 11 is rotating. Consequently, it can be considered that the output signal of the T-FF 81 is output as rotation-detection signal RD. However, the output signal of the T-FF 81 changes in accordance with the rotation of the rotor 112 of the motor 11. Accordingly, in the present embodiment, the latch circuit 82 is provided such that, after the rotation of the rotor 112 of the motor 11 is started and the output signal of the T-FF 81 first changes to the L level, the rotation-detection signal RD is maintained at the L level until the trigger switch 16 is turned OFF.

The latch circuit 82 comprises an OR circuit 82*a* and diode D5. The output signal of the T-FF 81 is input to a first input terminal (pin) of the OR circuit 82*a* and the anode of the diode D5 via resistor R5. The trigger signal TR is input to a second input terminal (pin) of the OR circuit 82*a*. The OR circuit 82*a* computes the logical OR of the trigger signal TR and the logic level corresponding to the voltage value of the first input terminal (the same value as the voltage value at point A in FIG. 7) and outputs the computation result thereof. The cathode of the diode D5 is connected to the output terminal of the OR circuit 82*a*. The output signal of the OR circuit 82*a* is called "latch output" hereinbelow.

As illustrated in FIG. 7, because the output signal of the T-FF 81 is maintained at the H level while the rotor 112 is stopped, as described above, the voltage at point A is at the H level, and the latch output is also at the H level. In this state, when the trigger switch 16 is turned ON, the rotation of the rotor 112 of motor 11 starts, and the first filter signal UHf changes to the H level, the output signal of the T-FF 81, the voltage value at point A, and the latch output are all at the L level (0 V).

Subsequently, when the motor 11 has rotated 360° relative to the stator 111 and the first filter signal UHf once again changes from the L level to the H level, the output signal of the T-FF 81 changes to the H level. At this time, if there were no diode D5, the voltage value at point A would also change to the voltage value corresponding to the H level. However, in the present embodiment, because the diode D5 is provided, even if the output signal of the T-FF 81 changes to the H level in the state in which the latch output is at the L level, the voltage value at point A does not change to the value corresponding to the H level and, as illustrated in FIG. 7, rises to and remains at the forward-voltage value of the diode D5 or a low-voltage value Vr close thereto. Low-voltage value Vr is a value that is recognized as the L level in the OR circuit 82*a*. Consequently, as illustrated in FIG. 7, even if the output signal of the T-FF 81 changes to the H level, the latch output is maintained at the L level.

Furthermore, when the trigger switch 16 is turned OFF (made non-conductive) and the trigger signal TR changes to the H level, the output of the OR circuit 82*a* changes to the H level by virtue of the trigger signal TR changing to the H level, and the function that maintains the latch output at the L level, which is performed by the latch circuit 82, is canceled. After stipulated (predetermined) time To has elapsed since the trigger switch 16 turned OFF, the control circuit 14 stops the output of the drive instruction, and thereby the rotor 112 is stopped.

The delay circuit 83 delays the latch output by a constant delay time Td and outputs such as rotation-detection signal RD. The reason for outputting the latch output with a delay is as follows. That is, the actual rotational direction cannot be detected unless the rotor of the motor 11 is rotating. Consequently, the determination circuit 40 cannot properly determine whether a setting-signal inconsistency has occurred unless the determination is made after the rotor 112 of the motor 11 is actually rotating and the rotational direction of the rotor 112 of the motor 11 has been properly detected. To explain this with reference to FIG. 7, in the state in which the actual-rotational-direction signal is indefinite immediately after the rotation of the rotor 112 of the motor 11 has started, it is not possible to properly determine whether a setting-signal inconsistency has occurred. Consequently, in this indefinite state, the reliability of determination signal DET output from the determination-execution circuit 43 is low.

Accordingly, in the third embodiment, rotation-detection signal RD is output after being delayed so that determination signal DET is disabled by the disabling circuit 32 until the rotational direction is properly detected. By delaying rotation-detection signal RD, for example, determination signal DET (which is unreliable) can be disabled in the transition period from when the actual-rotational-direction signal is in an indefinite state until it changes to the L level, even if the fact that the rotor 112 of the motor 11 has rotated and the rotational direction are simultaneously detected. Furthermore, in the state in which the actual-rotational-direction signal is stabilized at the L level after delay time Td has elapsed, determination signal DET can be enabled.

It is noted that rotation-detection signal RD in the third embodiment is the inverse logic state of rotation-detection signal RD in the second embodiment. That is, in the second embodiment, rotation-detection signal RD is at the H level when the rotor of the motor 11 is rotating; in contrast, in the third embodiment, rotation-detection signal RD is at the L level when the rotor 112 of the motor 11 is rotating.

Accordingly, OR circuit 73a in disabling circuit 73 of the third embodiment processes rotation-detection signal RD without the inversion of the logic state. Accordingly, while rotation of the rotor 112 of the motor 11 is not being detected, the disabling circuit 73 of the third embodiment disables determination signal DET and turns the switch 61 ON, the same as the disabling circuit 32 of the second embodiment does. Furthermore, while the rotor 112 of the motor 11 is rotating, the switch 61 is turned ON and OFF in accordance with determination signal DET.

It is noted that, in the third embodiment, as shown in FIG. 6, error signal ER is input to the LED 20 via diode D1, and continuity-control signal ST is input to the LED 20 via the inverter circuit 33 and diode D2.

In addition, in the third embodiment, resistor R4 is connected to an input terminal (pin) of the control circuit 14 for the second setting signal DS2, and second setting signal DS2 is input to the control circuit 14 via the resistor R4. Although it is not essential to provide the resistor R4, the resistor R4 is provided in the third embodiment for the reason stated below.

That is, let us assume that the set rotational direction is set to the first direction and second setting signal DS2 is at the H level. Furthermore, let us assume that the resistor R4 is not provided. In such an embodiment, there is a possibility that, if an abnormality were to (hypothetically) occur at the input port of the control circuit 14 for the second setting signal DS2 and this input port were to be shorted to the ground line, then second setting signal DS2 input to the first XOR circuit 44 would change to the L level and thereby would be mistakenly determined by the determination circuit 40.

Accordingly, in the third embodiment, by providing the resistor R4, which has a resistance value that is higher than that of the resistor R2, second setting signal DS2 input to the determination circuit 40 would not change to the L level even if the input port were to be shorted to the ground line.

The electric work machine 120 according to the third embodiment described in detail above also achieves the same effects as those of the electric work machine 110 according to the second embodiment with respect to setting-signal inconsistency.

4. Fourth Embodiment

Figure 9:
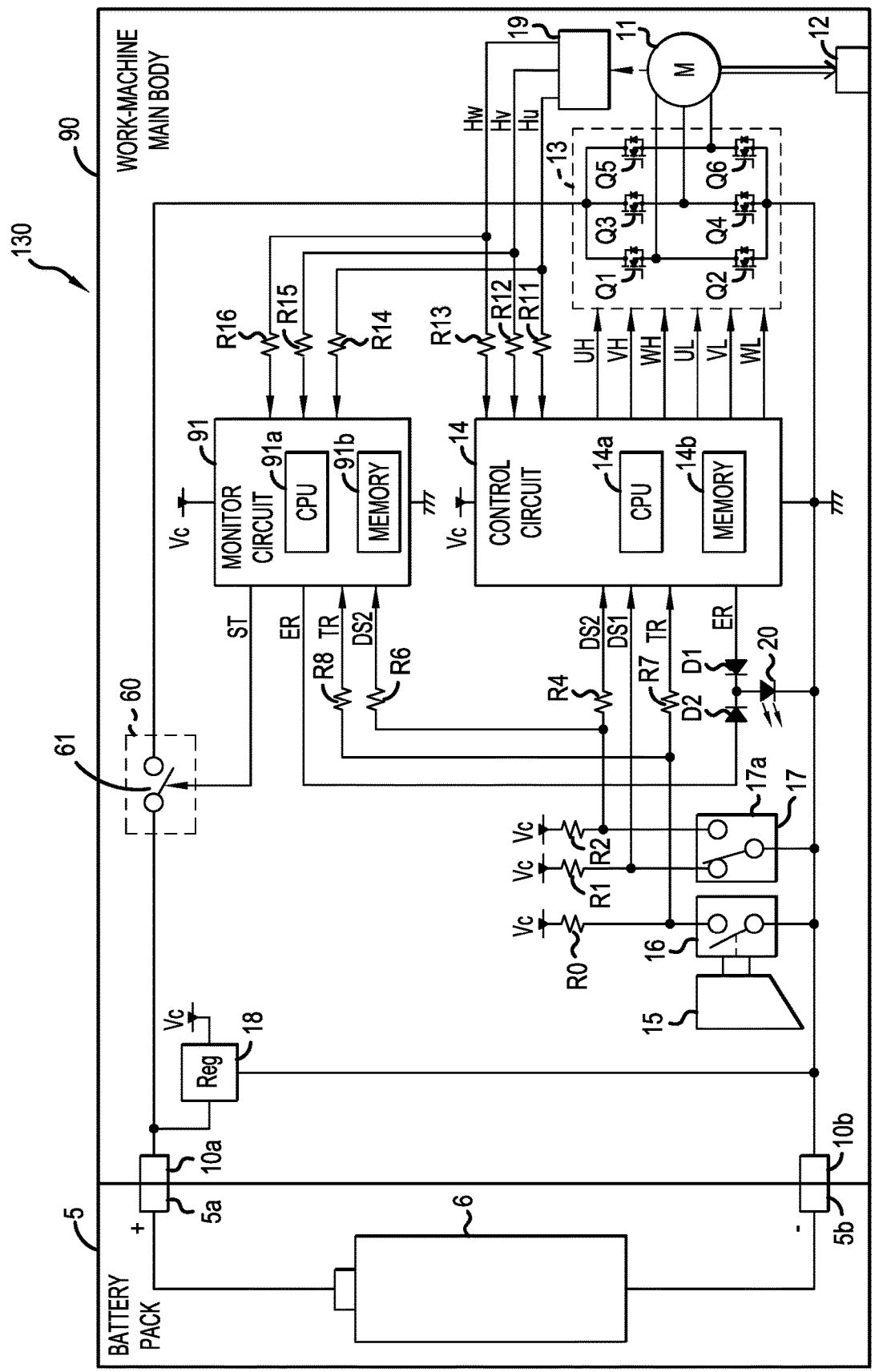
FIG. 9 is an explanatory diagram that shows the electrical configuration of the electric work machine according to a fourth embodiment of the present teachings.
Figure 10:
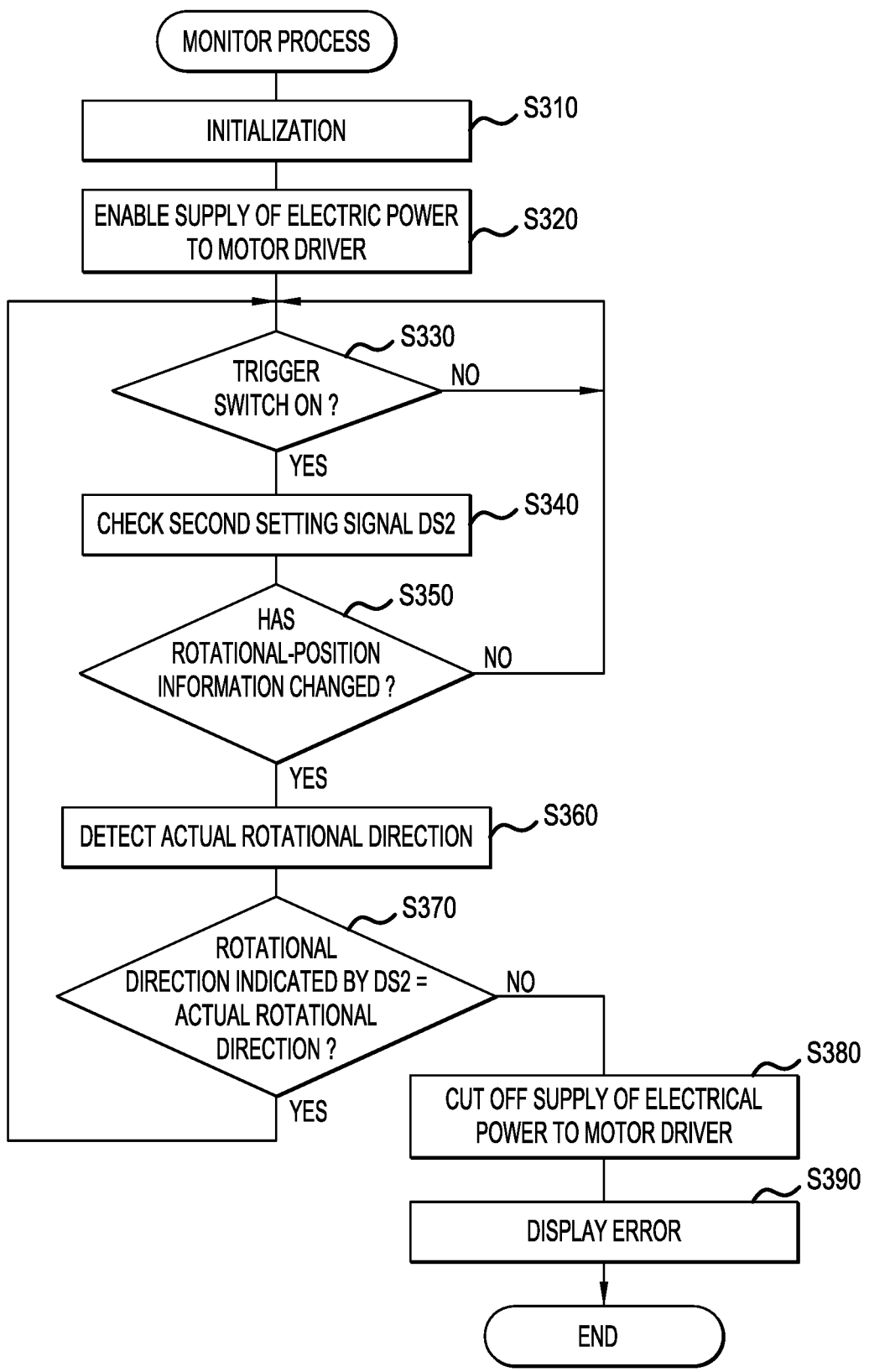
FIG. 10 is a flow chart of a monitoring process according to the fourth embodiment.

The principal points of difference between an electric work machine 130 according to a fourth embodiment and the first embodiment to the third embodiment are explained below, with reference to FIG. 9 and FIG. 10. In FIG. 9, reference symbols that are the same as those in FIG. 1, FIG. 3, and FIG. 6 indicate structural elements that are identical to those in FIG. 1, FIG. 3, and FIG. 6, and preceding explanations thereof are incorporated by reference into the present embodiment.

The electric work machine 130 of the fourth embodiment shown in FIG. 9 comprises a monitor circuit 91, which achieves the direction-setting monitoring function. In particular, the monitor circuit 91 is adapted/configured to perform the functions of the determination circuit 40 (including the rotational-direction detection circuit 41 and the determination-execution circuit 43), the rotation-detection circuit 50, 80 and the disabling circuit 32, 73 of the second and third embodiments. Therefore, the components (hardware, software, etc.) of the monitor circuit 91 that are capable of performing these functions should be considered to be a separate corresponding embodiment of the determination circuit 40 (including the rotational-direction detection circuit 41 and the determination-execution circuit 43), the rotation-detection circuit 50, 80 and/or the disabling circuit 32, 73. The monitor circuit 91 comprises a single-chip microcontroller comprising a CPU 91a, memory 91b, and the like. The memory 91b may include various kinds of semiconductor memory such as RAM, ROM, and nonvolatile memory.

Various programs, which are read and executed by the CPU 91a to achieve the direction-setting monitoring function, data, and the like are stored in the memory 91b. The programs stored in the memory 91b include a program for a monitoring process, which is shown in FIG. 10.

Trigger signal TR and second setting signal DS2 are input to both the control circuit 14 and the monitor circuit 91. It is noted that trigger signal TR is input to the control circuit 14 via a resistor R7 and is input to the monitor circuit 91 via resistor R8. Second setting signal DS2 is input to the control circuit 14 via the resistor R4 and is input to the monitor circuit 91 via resistor R6.

First position signal Hu is input to the control circuit 14 via resistor R11 and is input to the monitor circuit 91 via a resistor R14. Second position signal Hv is input to the control circuit 14 via resistor R12 and is input to the monitor circuit 91 via resistor R15. Third position signal Hw is input to the control circuit 14 via resistor R13 and is input to the monitor circuit 91 via resistor R16.

The monitoring process executed by the monitor circuit 91 (more specifically, the CPU 91a) will now be explained, with reference to FIG. 10. When the CPU 91a starts by virtue of it being supplied with control voltage Vc, the CPU 91a executes the monitoring process.

When the CPU 14a starts the monitoring process, it executes an initialization process in S310. In S320, the supply of battery power to the motor driver 13 is enabled. Specifically, continuity-control signal ST at the H level is output to the motor-stop circuit 60, thereby turning the switch 61 ON.

In S330, it is determined whether the trigger switch 16 is ON. While the trigger switch 16 is OFF, the process in S330 is performed repetitively. When the trigger switch 16 is turned ON, the process proceeds to S340.

In S340, second setting signal DS2 is checked. Specifically, the rotational direction indicated by the second setting signal DS2 (hereinbelow, called the "second set direction") is acquired.

In S350, it is determined whether the rotational-position information has changed. When the rotor 112 of the motor 11 is stopped, the rotational-position information does not change. On the other hand, as illustrated in FIG. 4 and FIG. 5, when the rotor of the motor 11 rotates, the rotational-position information changes in accordance with the rotational position of the rotor 112 relative to the stator. The process in S350 determines whether or not the rotor 112 of the motor 11 is rotating.

In S350, when the rotational-position information has not changed, the process proceeds to S330. When a change in the rotational-position information has occurred, that is, when any one of first position signal Hu, second position signal Hv, and third position signal Hw output by the rotational-position detection part (sensor circuit board) 19 has changed, the process proceeds to S360. In S360, the actual rotational direction of the rotor 112 is detected based on the rotational-position information.

In S370, it is determined whether the second set direction acquired in S340 and the actual rotational direction detected in S360 are consistent. When the second set direction and the actual rotational direction are consistent, the process proceeds to S330. When the second set direction and the actual rotational direction are inconsistent, the process proceeds to S380.

In S380, the supply of battery power to the motor driver 13 is cut off. Specifically, continuity-control signal ST at the L level is output to the motor-stop circuit 60, and thereby the switch 61 is turned OFF (made non-conductive).

In S390, an error is displayed. Specifically, error signal ER at the H level is output to the LED 20 via the diode D2, and thereby the LED 20 is turned ON.

It is noted that, because the rotor 112 of the motor 11 rotates in accordance with first setting signal DS1, it can be said that the actual rotational direction detected by the monitor circuit 91 is the rotational direction corresponding to first setting signal DS1. Consequently, it can be understood that the process of S370, in essence, determines whether or not the rotational direction indicated by first setting signal DS1 and the rotational direction indicated by second setting signal DS2 are consistent.

Effects equivalent to those in the second embodiment and the third embodiment with regard to setting-signal inconsistency are achieved also by the electric work machine 130 of the fourth embodiment described in detail above.

Furthermore, in the electric work machine 130, the determination of whether a setting-signal inconsistency has occurred is performed by software processing in the monitor circuit 91. Consequently, it becomes possible to appropriately perform the determination based on the actual rotational direction while simplifying the hardware configuration of the electric work machine 130.

Other Embodiments

Embodiments of the present disclosure were explained above, but the present disclosure is not limited to the embodiments described above and it is understood that various modifications may be effected.

(5-1) In the electric work machine 110 of the second embodiment (refer to FIG. 3), the control circuit 31 may be modified to receive second setting signal DS2 and the determination of whether a setting-signal inconsistency has occurred may be made based on first setting signal DS1 and second setting signal DS2. Furthermore, when a setting-signal inconsistency has occurred, the rotor 112 of the motor 11 may be stopped or prevented from rotating by a drive instruction.

Conversely, in the electric work machine 120 of the third embodiment (refer to FIG. 6) and the electric work machine 130 of the fourth embodiment (refer to FIG. 9), the control circuit 31 in the electric work machine 110 of the second embodiment may be used instead of the control circuit 14. That is, the determination of whether a setting-signal inconsistency has occurred may be implemented by hardware other than the control circuit or by software.

(5-2) In the electric work machine 130 of the fourth embodiment, the monitor circuit 91 may perform, based on a drive instruction, at least one of the detection of the actual rotational direction and the detection of whether the rotor 112 of the motor 11 is rotating, the same as in the electric work machine 120 of the third embodiment.

(5-3) Conversely to each of the above-mentioned embodiments, the voltage at the second terminal of the selection switch 17a may be output as first setting signal DS1, and the voltage at the first terminal of the selection switch 17a may be output as second setting signal DS2.

In such an embodiment, for example, in the second embodiment (refer to FIG. 3) and the third embodiment (refer to FIG. 6), a determination-execution circuit may be configured to properly determine whether the actual rotational direction and the set (user-selected) rotational direction are consistent based on second setting signal DS2 from the first terminal of the selection switch 17a and the actual-rotational-direction signal from the D-FF 42.

The rotational-direction selection part 17 may be different from that in each of the above-mentioned embodiments. For example, first setting signal DS1 and second setting signal DS2 may indicate the same logical value. That is, for example, for both first setting signal DS1 and second setting signal DS2, the H level may indicate the first direction and the L level may indicate the second direction. In addition, the rotational-direction selection part 17 may generate first setting signal DS1 and second setting signal DS2 by any method. The rotational-direction selection part 17 may generate first setting signal DS1 and second setting signal DS2 by a circuit, or the like, that differs from the selection switch 17a.

(5-4) The rotational-direction selection part 17 may be configured such that it switches to one of a first state, a second state, and a neutral state in response to manipulation of the above-mentioned selection manipulatable part 30 in the rotational-direction selection part 17 by the user. In the first state, for example, the common terminal and the first terminal of the selection switch 17a are connected as shown in FIG. 1, i.e., the first rotational direction is selected as the rotational direction. In the second state, the common terminal and the second terminal of the selection switch 17a are connected, i.e., the state in which the second rotational direction is selected as the rotational direction. In the neutral state, the common terminal of the selection switch 17a is connected to neither the first terminal nor the second terminal, i.e., the indefinite (neutral) state in which neither the first rotational direction nor the second rotational direction is selected as the rotational direction.

By manipulating the selection manipulatable part 30 (e.g., back-and-forth manipulation/pressing), the user can switch the rotational-direction selection part 17 to either the first state or the second state. The neutral state occurs in the process in which the state changes from the first state to the second state and in the process in which the state changes from the second state to the first state.

Furthermore, the trigger-manipulatable part 15 may be configured such that, while the ON manipulation is possible when the rotational-direction selection part 17 is in the first state or the second state, the ON manipulation is not possible when the rotational-direction selection part 17 is in the neutral state.

Figure 11:
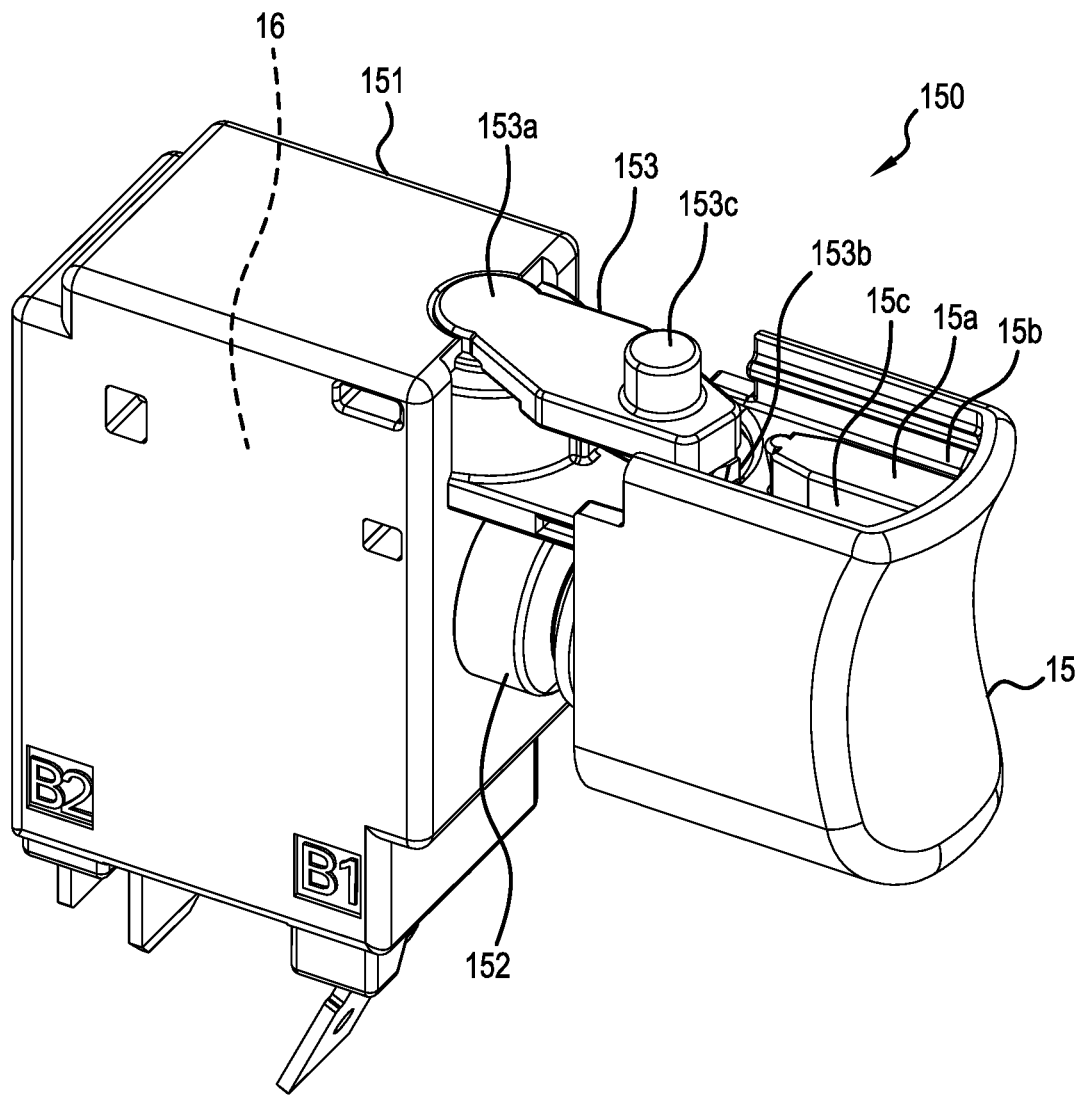
FIG. 11 is an oblique view of a trigger unit.

A specific structural example of the rotational-direction selection part 17 and the trigger-manipulatable part 15 configured in this manner is shown in FIG. 11. The trigger unit 150 shown in FIG. 11 can also be used in any of the electric work machines 1, 110, 120, 130 of the above-mentioned embodiments.

As shown in FIG. 11, the trigger unit 150 comprises the trigger-manipulatable part 15 and a switch box 151. The trigger switch 16 and the selection switch 17a are built into the switch box 151. The trigger-manipulatable part 15 is coupled to the switch box 151 via a plunger 152. The plunger 152 is connected to the trigger-manipulatable part 15. FIG. 11 illustrates the state in which the trigger-manipulatable part 15 has been moved (manually released) to the OFF position (e.g., the state in which the trigger-manipulatable part 15 is not being depressed by the user). When the trigger-manipulatable part 15 is not being depressed by the user, the trigger-manipulatable part 15 is maintained at the position shown in FIG. 11 (the position corresponding to an OFF manipulation) owing to a biasing force produced by a biasing member (e.g., a spring), which is not shown.

When the trigger-manipulatable part 15, which has been moved to the OFF position, is manipulated (depressed) by the user pulling it against the biasing force of the biasing member, the trigger-manipulatable part 15 moves toward the switch box 151. Thereby, the trigger-manipulatable part 15 is manipulated (manually moved) to the ON position. That is, the trigger switch 16 turns ON.

The trigger unit 150 further comprises a substantially rod-shaped lever 153. The lever 153 comprises a pivot shaft 153a, a projection 153b, and a latching part 153c. The pivot shaft 153a is provided at a first end of the lever 153. The projection 153b is provided at a second end of the lever 153. The pivot shaft 153a is journaled on the switch box 151 so as to be pivotable. Thereby, as illustrated in FIG. 12, the lever 153 is pivotable about the center of the pivot shaft 153a.

Figure 12:
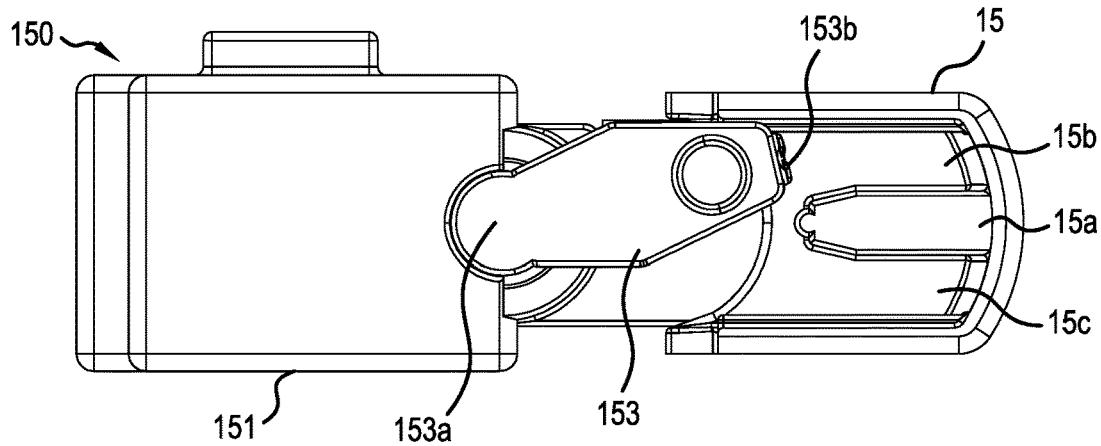
FIG. 12 is an explanatory diagram for explaining the pivoting of a lever in the trigger unit.
Figure 12:
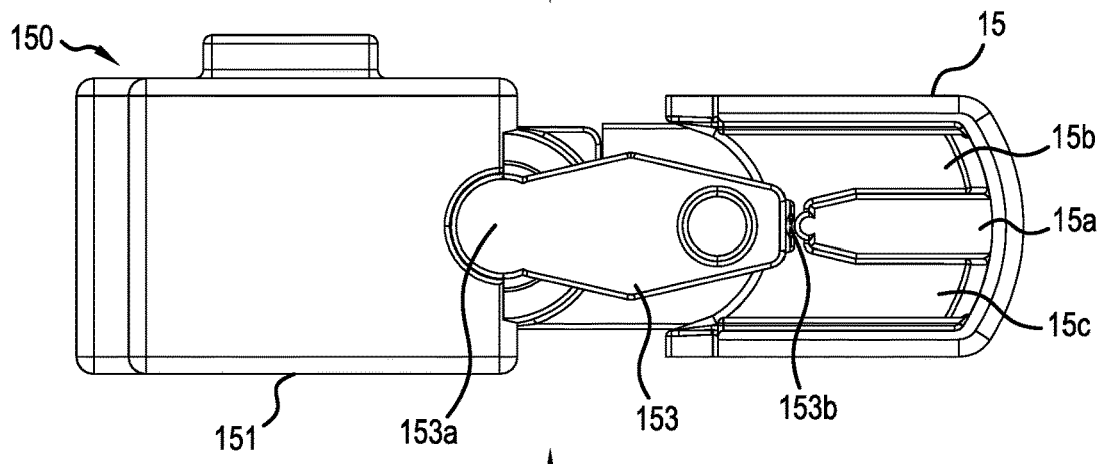
Figure 12:
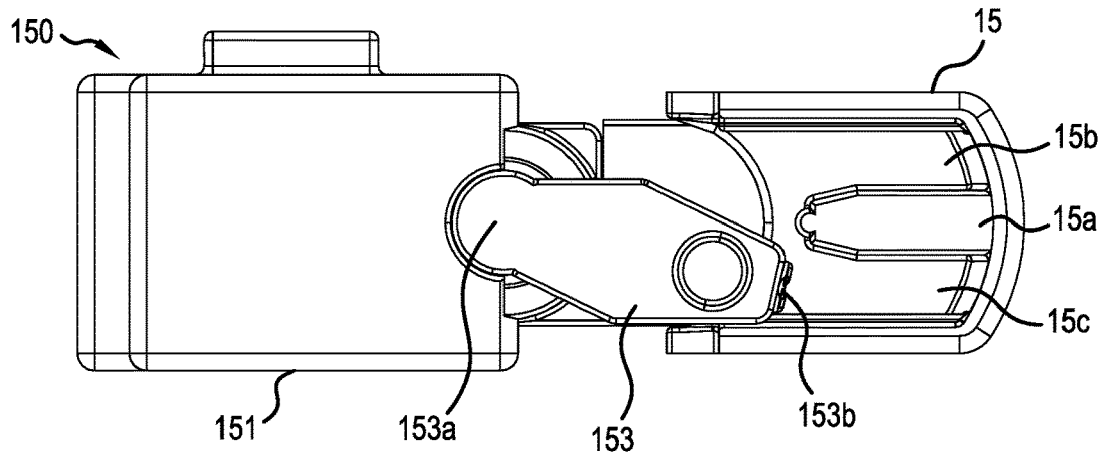

As shown in FIG. 11 and FIG. 12, a first insertion opening 15b and a second insertion opening 15c are provided in the trigger-manipulatable part 15. A restricting member (blocking member) 15a is provided between the first insertion opening 15b and the second insertion opening 15c.

The latching part 153c is operably coupled to the above-described selection manipulatable part 30 of the rotational-direction selection part 17. Therefore, the lever 153 pivots in conjunction with the manipulation (movement) of the selection manipulatable part 30. For example, when the rotational-direction selection part 17 is set (moved/shifted) to the first state, as illustrated in the upper level of FIG. 12, a first outer-side surface of the lever 153 makes contact with or approaches a first inner-side surface of the trigger-manipulatable part 15. Conversely, when the rotational-direction selection part 17 is set (moved/shifted) to the second state, as illustrated in the lower level of FIG. 12, a second outer-side surface of the lever 153 makes contact with or approaches a second inner-side surface of the trigger-manipulatable part 15. Furthermore, when the rotational-direction selection part 17 is set (moved/shifted) to the neutral state, as illustrated in the middle level of FIG. 12, the projection 153b of the lever 153 opposes the restricting member 15a.

When the rotational-direction selection part 17 is set (moved/shifted) to the first state, the projection 153b advances into the first insertion opening 15b as the manipulation of pulling the trigger-manipulatable part 15 advances. When the rotational-direction selection part 17 is set (moved/shifted) to the second state, the projection 153b advances into the second insertion opening 15c as the manipulation of pulling the trigger-manipulatable part 15 advances.

On the other hand, when the rotational-direction selection part 17 is set (moved/shifted) to the neutral state and the trigger-manipulatable part 15 is pulled, even though the trigger-manipulatable part 15 moves slightly toward the switch box 151, the restricting member (blocking member) 15a makes contact with the projection 153b, and thus further movement is restricted (blocked). Because the user can pull the trigger-manipulatable part 15 only slightly, the user can recognize that the rotational-direction selection part 17 is in the neutral state and should be firmly moved/shifted to either the first state or the second state.

It is noted that, in the neutral state, even though the user can pull the trigger-manipulatable part 15 only slightly up until the restricting member 15a makes contact with the projection 153b, when the restricting member 15a makes contact with the projection 153, the trigger switch 16 turns ON (becomes conductive).

Figure 13:
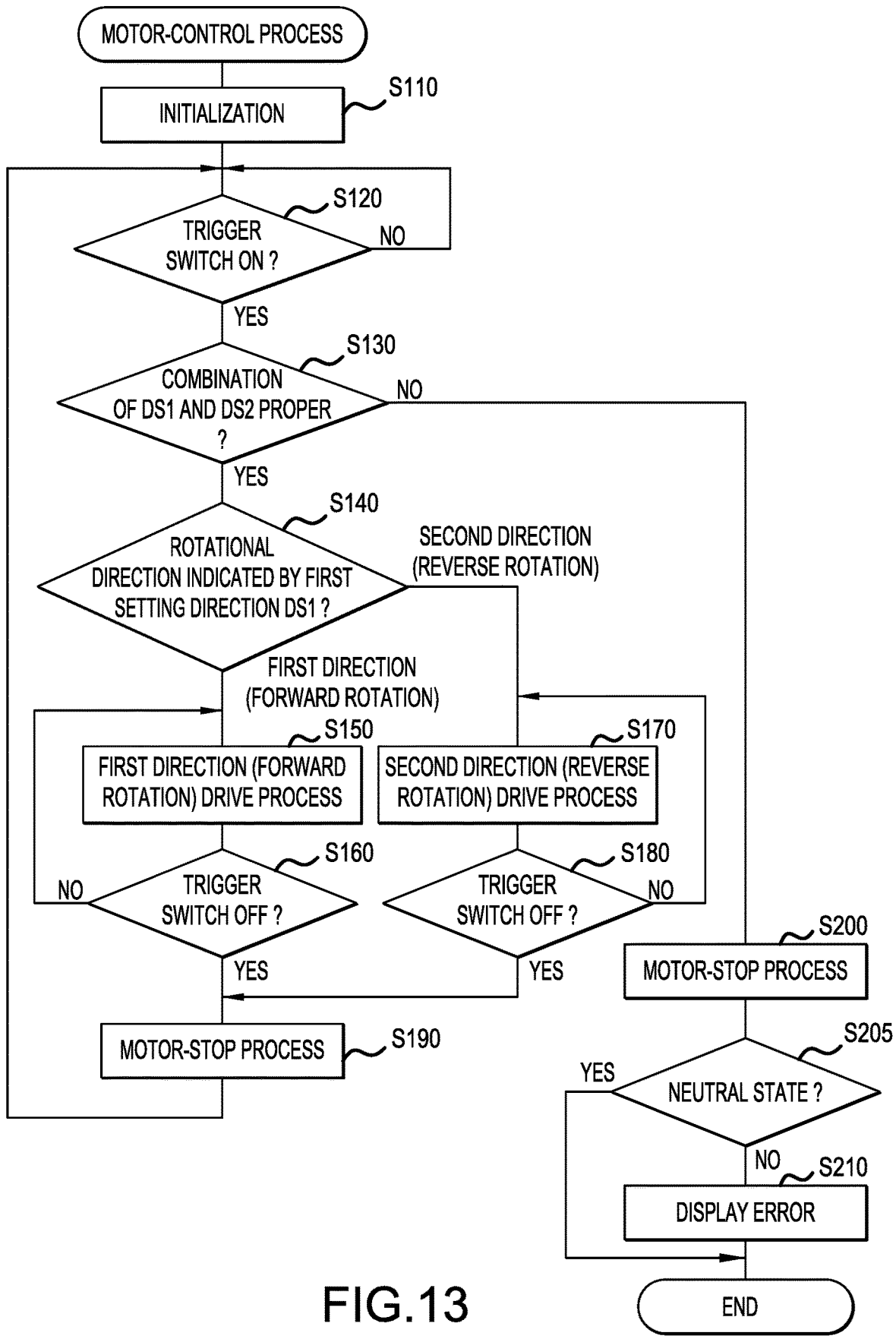
FIG. 13 is a flow chart of a modified example of the motor-control process.

When the trigger unit 150 configured in this manner is, for example, installed on the electric work machine 1 of the first embodiment, the control circuit 14 may, for example, be adapted/configured (e.g., programmed) to execute the motor-control process shown in FIG. 13. The motor-control process shown in FIG. 13 differs from the motor-control process of the first embodiment shown in FIG. 2 in that the process of S205 has been added.

That is, in the motor-control process shown in FIG. 13, after the rotation of the rotor 112 of the motor 11 is stopped in S200, the process proceeds to S205. In S205, it is determined whether or not the selection switch 17a of the rotational-direction selection part 17 is in the neutral state. For example, it may be determined that the selection switch 17a is in the neutral state when first setting signal DS1 and second setting signal DS2 are both at the H level. When it is determined in S205 that the selection switch 17a of the rotational-direction selection part 17 is not in the neutral state, the process proceeds to S210, in which an error is displayed. On the other hand, when it is determined in S205 that the selection switch 17a of the rotational-direction selection part 17 is in the neutral state, an error is not displayed, and the motor-control process ends. The neutral state is a rotational-direction indefinite state, in which the rotational direction has not been clearly selected by the user, and does not mean that an abnormality has occurred in the rotational-direction selection part 17. Consequently, when the selection switch 17a is in the neutral state, even though the rotor 112 is not caused to rotate despite the trigger switch 16 being ON, an error is not displayed.

It is noted that, in the neutral state, first setting signal DS1 and second setting signal DS2 both being at the H level is but one example. The rotational-direction selection part 17 may be configured such that, in the neutral state, a signal is output that indicates the neutral state and differs from first setting signal DS1 at the H level and second setting signal DS2 at the H level.

(5-5) The motor 11 of the present disclosure may be a motor that differs from a brushless motor. The motor of the present disclosure may be, for example, a brushed DC motor.

(5-6) The electric work machine of the present disclosure does not have to be configured such that a battery pack is mountable thereon and demountable therefrom. That is, the present disclosure is also applicable to an electric work machine in which, for example, a battery is built in. Furthermore, the present disclosure is also applicable to an electric work machine that does not use battery power as the electric power for driving the motor and instead is configured to drive the motor by receiving AC electrical power from outside the electric work machine, in which case the motor 11 may be an AC motor.

(5-7) The present disclosure may be applied to various types of electric work machines. Specifically, the present disclosure may be applied to, for example, various types of electric work machines such as power tools for masonry, metalworking, and carpentry, work machines for gardening (e.g., outdoor power equipment), and apparatuses that put in order the environment of a work site, all of which are used in work sites such as for commercial or do-it-yourself carpentry, manufacturing, gardening, construction, and the like. More specifically, the present disclosure may be applied to various types of electric work machines such as, for example, power rotary hammers, power hammer driver-drills, power driver-drills, power drivers, power wrenches, power grinders, power circular saws, power reciprocating saws, power jigsaws, power cutters, power chainsaws, power planes, power hedge trimmers, power lawnmowers, power lawn clippers, power brush cutters, power blowers, and the like.

(5-8) A plurality of functions having a single structural element in the embodiments above may be implemented by a plurality of structural elements, and a single function having a single structural element may be implemented by a plurality of structural elements. In addition, a plurality of functions having a plurality of structural elements may be implemented by a single structural element, and a single function implemented by a plurality of structural elements may be implemented by a single structural element. In addition, a portion of the configuration of each embodiment above may be omitted. In addition, at least a portion of the configuration of each embodiment above may be supplemented or substituted by the configuration of other embodiments above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as power tools, in which the rotational direction of a rotor of the motor can be changed.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block, part or component of a device, such as the control circuits 14, 31 and monitor circuit 91, is also understood as a corresponding method step or as a feature of a method step. In an analogous manner, aspects which have been described in the context of or as a method step also represent a description of a corresponding block, part, detail, algorithm or feature of a corresponding device, such as the control circuits 14, 31 and monitor circuit 91.

Depending on certain implementation requirements, exemplary embodiments of the control circuits 14, 31 and monitor circuit 91 of the present disclosure may be implemented in hardware and/or in software. The implementation can be configured using a digital storage medium (non-transitory computer-readable medium), for example one or more of a ROM, a PROM, an EPROM, an EEPROM or a flash memory, on which electronically readable control signals (program code-computer-readable instructions) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control circuits 14, 31 and monitor circuit 91, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes in the control circuits 14, 31 and monitor circuit 91.

Therefore, although some aspects of the control circuits 14, 31 and monitor circuit 91 have been identified as "parts" or "steps", it is understood that such parts or steps need not be physically separate or distinct electrical components, but rather may be different blocks of program code that are executed by the same hardware component, e.g., one or more microprocessors.

EXPLANATION OF THE REFERENCE NUMBERS 1, 110, 120, 130 Electric work machine
5 Battery pack
6 Battery
10 Work-machine main body
11 Motor
13 Motor driver
14, 31 Control circuit
15 Trigger manipulatable part
16 Trigger switch
17 Rotational-direction selection part
17a Selection switch
19 Rotational-position detection part
32 Disabling circuit
40 Determination circuit
41 Rotational-direction detection circuit
43 Determination-execution circuit
50, 80 Rotation-detection circuit
60 Motor-stop circuit
61 Switch
73 Disabling circuit
91 Monitor circuit
111 Stator
112 Rotor
113 Rotary shaft
114 Gear transmission

The invention claimed is:

1. An electric work machine comprising:
a motor having a rotor;
a drive circuit configured to drive the motor using electric power supplied from a power supply;
a manual switch configured (i) to be manually operated by a user to selectively set a rotational direction of the rotor to either a first rotational direction or a second rotational direction and (ii) to output a first setting signal and a second setting signal that both indicate the set rotational direction; and
a motor controller configured (i) to receive the first setting signal and the second setting signal from the manual switch, (ii) to control the drive circuit such that the rotor rotates in the rotational direction indicated by the first setting signal and/or the second setting signal, and (iii) to stop or prevent rotation of the rotor in response to a determination that the rotational direction indicated by the first setting signal and the rotational direction indicated by the second setting signal do not indicate the same direction of rotation of the rotor.

2. The electric work machine according to claim 1, wherein the motor controller is configured to:
receive the first setting signal and the second setting signal that were output from the manual switch,
control the drive circuit such that the rotor rotates in the rotational direction indicated by the received first setting signal and/or the received second setting signal, and
control the drive circuit such that the rotation of the rotor is stopped or prevented in response to a determination that the rotational direction indicated by the first setting signal and the rotational direction indicated by the second setting signal do not indicate the same direction of rotation of the rotor.

3. The electric work machine according to claim 1, further comprising:
a trigger manipulatable part configured to be manipulated by the user to cause the rotor to rotate;
wherein:
the motor controller is configured to control the drive circuit such that the rotor rotates in response to the trigger manipulatable part being manipulated; and
the motor controller is configured to stop or prevent the rotation of the rotor in response to a determination, at or after the time at which the trigger manipulatable part was manipulated, that the rotational direction indicated by the first setting signal and the rotational direction indicated by the second setting signal do not indicate the same direction of rotation of the rotor.

4. The electric work machine according to claim 1, wherein:
the manual switch has a neutral state, in which neither the first rotational direction nor the second rotational direction is selected; and
the motor controller is configured to stop or prevent rotation of the rotor when the manual switch is in the neutral state.

5. The electric work machine according to claim 1, wherein the manual switch includes:
a selection manipulatable part configured to be manually operated by the user to manually select the first rotational direction or the second rotational direction; and
a selection switch operably coupled to the selection manipulatable part and configured to output the first setting signal and the second setting signal.

6. The electric work machine according to claim 1, wherein the manual switch includes:
a first terminal;
a second terminal; and
a common terminal configured to be electrically connected (i) to the first terminal in response to the first rotational direction being selected by the user manually operating the manual switch, and (ii) to the second terminal in response to the second rotational direction being selected by the user manually operating the manual switch,
wherein:
a first voltage at the first terminal corresponds to the first setting signal;
a second voltage at the second terminal corresponds to the second setting signal; and
the first voltage is different from the second voltage.

7. The electric work machine according to claim 1, wherein the manual switch is configured to simultaneously output the first setting signal and the second setting signal.

8. The electric work machine according to claim 2, further comprising:
a trigger manipulatable part configured to be manipulated by the user to cause the rotor to rotate; and a control circuit configured to control the drive circuit such that the rotor rotates in response to the trigger manipulatable part being manipulated;

wherein the control circuit is configured to control the drive circuit so as to stop or prevent the rotation of the rotor in response to a determination, at the time at which the trigger manipulatable part was manipulated, that the rotational direction indicated by the first setting signal and the rotational direction indicated by the second setting signal do not indicate the same direction of rotation of the rotor.

9. An electric work machine comprising:
a motor having a rotor;
a drive circuit configured to drive the motor using electric power supplied from a power supply;
a manual switch configured (i) to be manually operated by a user to selectively set a rotational direction of the rotor to either a first rotational direction or a second rotational direction and (ii) to output a first setting signal and a second setting signal that both indicate the set rotational direction; and
a motor controller configured (i) to receive the first setting signal and the second setting signal from the manual switch, (ii) to control the drive circuit such that the rotor rotates in the rotational direction indicated by the first setting signal and/or the second setting signal, and (iii) to stop or prevent rotation of the rotor in response to a determination that the rotational direction indicated by the first setting signal and the rotational direction indicated by the second setting signal are inconsistent;
wherein the motor controller comprises:
a control circuit configured to receive the first setting signal output from the manual switch and to control the drive circuit such that the rotor rotates in the rotational direction indicated by the first setting signal;
a determination circuit configured to receive the second setting signal output from the manual switch and to determine whether the rotational direction indicated by the second setting signal and an actual rotating direction of the rotor are consistent; and
a stop circuit configured to stop or prevent the rotation of the rotor in response to a determination by the determination circuit that there is an inconsistency between the rotational direction indicated by the second setting signal and the actual rotating direction of the rotor.

10. The electric work machine according to claim 9, wherein the control circuit is further configured to receive the second setting signal output from the manual switch and to control the drive circuit such that rotation of the rotor is stopped or prevented in response to a determination that the rotational direction indicated by the first setting signal and the rotational direction indicated by the second setting signal are inconsistent.

11. The electric work machine according to claim 9, wherein the determination circuit comprises:
a rotational-direction detection circuit configured to detect the actual rotating direction of the rotor; and
a determination-execution circuit configured to determine whether the rotational direction indicated by the second setting signal received by the determination circuit and the actual rotating direction detected by the rotational-direction detection circuit are consistent.

12. The electric work machine according to claim 11, further comprising:
a position-information output part configured to output rotational-position information corresponding to a rotational position of the rotor;
wherein the rotational-direction detection circuit is configured to detect the actual rotational direction based on the rotational-position information output from the position-information output part.

13. The electric work machine according to claim 11, wherein:
the control circuit is configured to control the drive circuit by outputting a drive instruction to the drive circuit; and
the rotational-direction detection circuit is configured to receive the drive instruction, which is supplied by the control circuit to the drive circuit, and to detect the actual rotating direction of the rotor based on the drive instruction.

14. The electric work machine according to claim 9, wherein the motor controller further comprises:
a rotation-detection circuit configured to detect whether or not the rotor is rotating; and
a disabling circuit configured to disable a function that, while rotation of the rotor is not being detected, stops the rotation of the rotor using the stop circuit.

15. The electric work machine according to claim 14, further comprising:
a position-information output part configured to output rotational-position information corresponding to the rotational position of the rotor;
wherein the rotation-detection circuit is configured to detect, based on the rotational-position information output from the position-information output part, whether or not the rotor is rotating.

16. The electric work machine according to claim 14, wherein:
the control circuit is configured to control the drive circuit by outputting a drive instruction to the drive circuit; and
the rotation-detection circuit is configured to input the drive instruction, which is supplied by the control circuit to the drive circuit, and to detect, based on the drive instruction, whether or not the rotor is rotating.

17. The electric work machine according to claim 13, wherein:
the drive circuit comprises six switching devices, which include a first switching device and a second switching device;
the drive instruction includes six drive signals, which are respectively input to the six switching devices and which include a first drive signal input to the first switching device and a second drive signal input to the second switching device;
the control circuit is configured to generate three-phase electric power to drive the motor by turning ON each of the six switching devices using the six drive signals during an energization interval for each of the six switching devices that starts from an energization-start time until the rotor rotates by an energization electric angle, wherein the energization-start times respectively correspond to the rotational position of the rotor, and the energization-start times for the six switching devices are phase-shifted from one another by a fixed electric angle; and
the rotational-direction detection circuit is configured to detect the actual rotating direction of the rotor based on the first drive signal and the second drive signal.

18. The electric work machine according to claim 17, wherein:
the control circuit is configured to generate the three-phase electric power by controlling the ON time of each of the six switching devices during each of the energization intervals using a pulse-width-modulation method, in which each of the six drive signals includes instructions for periodically switching ON and OFF each of the six switching devices at a switching frequency;

the electric work machine further comprises:
 a first low-pass filter configured to receive the first drive signal, to attenuate signal components, which are contained in the first drive signal, having a frequency higher than a first cutoff frequency and to output a filtered first drive signal containing signal components below the first cutoff frequency; and
 a second low-pass filter configured to receive the second drive signal, to attenuate signal components, which are contained in the second drive signal, having a frequency higher than a second cutoff frequency and to output a filtered second drive signal containing signal components below the second cutoff frequency;

the first cutoff frequency and the second cutoff frequency are lower than the switching frequency; and the rotational-direction detection circuit is configured to detect the actual rotating direction of the rotor based on the filtered first drive signal and the filtered second drive signal.

19. The electric work machine according to claim 18, wherein:
the control circuit is configured to rotate the rotor at a maximum rotational speed or lower;
the first cutoff frequency and the second cutoff frequency are higher than a maximum commutation frequency; and
the maximum commutation frequency is the inverse of the time needed for the rotor rotating at the maximum rotational speed to rotate by the fixed electrical angle.

20. The electric work machine according to claim 16, wherein:
the drive circuit comprises six switching devices;
the drive instruction includes six drive signals that are respectively input to the six switching devices;
the control circuit is configured to generate three-phase electric power for driving the motor by turning ON each of the six switching devices using the six drive signals during respective energization intervals, which are based on the rotational position of the rotor and in which the phases for each of the six switching devices differ; and
the rotation-detection circuit is configured to detect, based on one of the six drive signals, whether or not the rotor is rotating.

21. The electric work machine according to claim 20, wherein:
the control circuit is configured to generate the three-phase electric power by controlling the ON time of each of the six switching devices using a pulse-width-modulation method during the respective energization intervals, in which each of the six drive signals includes instructions for periodically switching ON and OFF each of the six switching devices at a switching frequency;
the electric work machine further comprises a low-pass filter configured to attenuate signal components, which are contained in the one of the six drive signals, having a frequency is higher than a cutoff frequency and to output a filtered drive signal;
the cutoff frequency is lower than the switching frequency; and
the rotational-detection circuit is configured to detect, based on the filtered drive signal, whether or not the rotor is rotating.

22. The electric work machine according to claim 21, wherein:
the control circuit is configured to rotate the rotor at a maximum rotational speed or lower;
the cutoff frequency is higher than a maximum commutation frequency; and
the maximum commutation frequency is the inverse of the time needed for the rotor rotating at the maximum rotational speed to rotate by the fixed electrical angle.

23. A power tool comprising:
a motor having a rotor and a stator;
a drive circuit configured to supply electric currents to drive the rotor relative to the stator;
a forward/reverse change lever configured to be manipulated by a user to manually select a direction of rotation of the rotor relative to the stator;
a selection switch operably coupled to the forward/reverse change lever and configured to output a first setting signal and a second setting signal that both indicate the selected direction of rotation of the rotor; and
an electric circuit and/or a controller configured to:
 determine whether or not the first setting signal and the second setting signal both indicate the same direction of rotation of the rotor;
 enable the drive circuit to supply electric currents to drive the rotor in response to a determination that the first setting signal and the second setting signal both indicate the same direction of rotation of the rotor; and
 stop the supply of electric currents to drive the rotor in response to a determination that the first setting signal and the second setting signal do not indicate the same direction of rotation of the rotor.

* * * * *